US012785065B2

(12) United States Patent
Kim et al.

(10) Patent No.: US 12,785,065 B2
(45) **Date of Patent: *Nov. 3, 2026**

(54) ALL-SOLID SECONDARY BATTERY, AND METHOD OF MANUFACTURING ALL-SOLID SECONDARY BATTERY

(71) Applicant: Samsung Electronics Co., Ltd., Suwon-si (KR)

(72) Inventors: Jusik Kim, Hwaseong-si (KR); Sewon Kim, Suwon-si (KR); Victor Roev, Hwaseong-si (KR); Myungjin Lee, Seoul (KR); Saebom Ryu, Suwon-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 596 days.

This patent is subject to a terminal disclaimer.

(21) Appl. No.: 18/446,805

(22) Filed: Aug. 9, 2023

(65) Prior Publication Data

US 2024/0038965 A1 Feb. 1, 2024

Related U.S. Application Data

(63) Continuation of application No. 17/172,174, filed on Feb. 10, 2021, now Pat. No. 11,777,076.

(30) Foreign Application Priority Data

Feb. 18, 2020 (KR) ........................ 10-2020-0019988
Jan. 27, 2021 (KR) ........................ 10-2021-0011513

(51) Int. Cl.
*H01M 4/133* (2010.01)
*H01M 4/02* (2006.01)
(Continued)

(52) U.S. Cl.
CPC ........... *H01M 4/133* (2013.01); *H01M 4/134* (2013.01); *H01M 4/366* (2013.01); *H01M 4/382* (2013.01);
(Continued)

(58) Field of Classification Search
CPC ...... H01M 4/133; H01M 4/134; H01M 4/366; H01M 4/382; H01M 4/587; H01M 10/052;
(Continued)

(56) References Cited

U.S. PATENT DOCUMENTS 10,168,389 B2 1/2019 Fujiki et al.
2016/0344010 A1 11/2016 Zhamu et al.
(Continued)

FOREIGN PATENT DOCUMENTS

JP 200964574 A 3/2009
JP 2010267540 A 11/2010
(Continued)

OTHER PUBLICATIONS

Japanese Office Action for Japanese Patent Application No. 2021-024183 dated Apr. 8, 2025.
(Continued)

*Primary Examiner* — Eugenia Wang
(74) *Attorney, Agent, or Firm* — CANTOR COLBURN LLP

(57) ABSTRACT

An all-solid secondary battery including: a cathode layer including a cathode active material layer; an anode layer; and a solid electrolyte layer including a solid electrolyte, wherein the solid electrolyte layer is disposed between the cathode layer and the anode layer, wherein the anode layer includes an anode current collector, a first anode active material layer in contact with the solid electrolyte layer, and a second anode active material layer disposed between the
(Continued)

anode current collector and the first anode active material layer, wherein the first anode active material layer includes a first carbonaceous anode active material, and the second anode active material layer.

20 Claims, 29 Drawing Sheets

(51) Int. Cl.
*H01M 4/134* (2010.01)
*H01M 4/36* (2006.01)
*H01M 4/38* (2006.01)
*H01M 4/587* (2010.01)
*H01M 10/052* (2010.01)
*H01M 10/0562* (2010.01)

(52) U.S. Cl.
CPC ......... *H01M 4/587* (2013.01); *H01M 10/052* (2013.01); *H01M 10/0562* (2013.01); *H01M 2004/021* (2013.01); *H01M 2004/027* (2013.01); *H01M 2300/0071* (2013.01)

(58) Field of Classification Search
CPC ......... H01M 10/0562; H01M 10/0525; H01M 2004/021; H01M 2004/027; H01M 2300/0071; H01M 2300/0068
See application file for complete search history.

(56) References Cited

U.S. PATENT DOCUMENTS

| | | | |
|---|---|---|---|
| 2016/0351893 | A1* | 12/2016 | Wietelmann .......... H01M 4/623 |
| 2016/0351910 | A1 | 12/2016 | Albano et al. |
| 2018/0205112 | A1 | 7/2018 | Thomas-Alyea et al. |
| 2018/0226633 | A1 | 8/2018 | Fujiki et al. |
| 2019/0157723 | A1 | 5/2019 | Suzuki et al. |
| 2019/0305293 | A1 | 10/2019 | Sotowa et al. |
| 2019/0305294 | A1 | 10/2019 | Tateishi et al. |
| 2021/0005926 | A1 | 1/2021 | Holme et al. |
| 2021/0013496 | A1 | 1/2021 | Tsuzuki et al. |
| 2021/0184219 | A1 | 6/2021 | Sawada et al. |

FOREIGN PATENT DOCUMENTS

| | | | |
|---|---|---|---|
| JP | 5375545 | B2 | 12/2013 |
| JP | 201435818 | A | 2/2014 |
| JP | 2018055952 | A | 4/2018 |
| JP | 6432113 | B2 | 12/2018 |
| JP | 201996610 | A | 6/2019 |
| KR | 1020160065133 | A | 6/2016 |
| KR | 1020180011207 | A | 1/2018 |
| WO | 2012157047 | A1 | 11/2012 |
| WO | 2018123967 | A1 | 7/2018 |
| WO | 2019187537 | A1 | 10/2019 |
| WO | 2019216216 | A | 11/2019 |

OTHER PUBLICATIONS

Bogachuk et al., "Comparison of highly conductive natural and synthetic graphites for electrodes in perovskite solar cells", Carbon, 175, 2021, 10-18.

Kurita et al., "Raman spectra of carbon nanowalls grown by plasma-enhanced chemical vapor deposition", Journal of Applied Physiscs, 2005, No. 97, 104320.

Kuznetsov et al., "Raman spectra for characterization of defective CVD multi-walled carbon nanotubes", Phys. Status Solidi B 251, No. 12, 2014, pp. 2444-2450.

William Manalastas Jr. et al., "Mechanical failure of garnet electrolytes during Li electrodeposition observed by in-operando microscopy," Journal of Power Sources, 2019, pp. 287-293, vol. 412.

Yisi Zhu et al., "Dopant-Dependent Stability of Garnet Solid Electrolyte Interfaces with Lithium Metal," Adv. Energy Mater., 2019, pp. 1-11, vol. 1803440.

Yu et al., "Preparation of Carbon Nanomaterials by Thermal CVD and Their Hydrogen Storage Properties", Journal of the Korean Ceramic Society, vol. 38. Mp/ 10, pp. 867-870, 2001.

Office Action issued Nov. 27, 2025, in corresponding CN Patent Application No. 202110189863.8, with English Translation, 12 pp.

* cited by examiner

ALL-SOLID SECONDARY BATTERY, AND METHOD OF MANUFACTURING ALL-SOLID SECONDARY BATTERY

CROSS-REFERENCE TO RELATED APPLICATION

This application is a continuation of U.S. patent application Ser. No. 17/172,174, filed on Feb. 10, 2021, in the United States Patent and Trademark Office, which claims priority to and the benefit of Korean Patent Application No. 10-2020-0019988, filed on Feb. 18, 2020, and Korean Patent Application No. 10-2021-0011513, filed on Jan. 27, 2021, in the Korean Intellectual Property Office, and all the benefits accruing therefrom under 35 U.S.C. § 119, the contents of which in their entirety are incorporated herein by reference.

BACKGROUND

1. Field

The present disclosure relates to an all-solid secondary battery and a method of manufacturing the same.

2. Description of Related Art

Batteries having high energy density and high safety have been actively developed in accordance with industrial demand. For example, lithium-ion batteries are commercially available in the automotive field as well as in the fields of information-associated equipment and communication equipment. In the automotive field, the safety of lithium-ion batteries is particularly important.

A commercialized lithium-ion battery includes a liquid electrolyte including a flammable organic solvent, and thus there is a risk of overheating and fire when a short-circuit occurs. Accordingly, there is a need for an all-solid battery including a solid electrolyte instead of a liquid electrolyte.

SUMMARY

Provided are an all-solid secondary battery which prevents a short-circuit during charging and discharging and has improved cycle characteristics and a method of manufacturing the same.

Additional aspects will be set forth in part in the description which follows and, in part, will be apparent from the description, or may be learned by practice of the presented aspects of the disclosure.

According to an aspect of an aspect, an all-solid secondary battery includes:

a cathode layer including a cathode active material layer;

an anode layer; and a solid electrolyte layer including a solid electrolyte, wherein the solid electrolyte layer is disposed between the cathode layer and the anode layer, wherein the anode layer comprises an anode current collector, a first anode active material layer in contact with the solid electrolyte layer, and a second anode active material layer disposed between the anode current collector and the first anode active material layer, wherein the first anode active material layer includes a first carbonaceous anode active material, and the second anode active material layer includes a second carbonaceous anode active material, and wherein a first intensity ratio of an intensity of a D band peak to an intensity of a G band peak in a Raman spectrum of the first carbonaceous anode active material is less than a second intensity ratio of an intensity of a D band peak to an intensity of a G band peak in a Raman spectrum of the second carbonaceous anode active material.

According to an aspect of another aspect, a method of manufacturing an all-solid secondary battery includes:

providing a solid electrolyte layer;

disposing a first anode active material composition on a first surface of the solid electrolyte layer;

thermally treating the first anode active material composition to form a first anode active material layer;

disposing a second anode active material layer on a surface of the first anode active material layer; and disposing a cathode active material layer on a second surface of the solid electrolyte layer.

BRIEF DESCRIPTION OF THE DRAWINGS

The above and other aspects, features, and advantages of certain aspects of the disclosure will be more apparent from the following description taken in conjunction with the accompanying drawings, in which.

DETAILED DESCRIPTION

Figure 1:
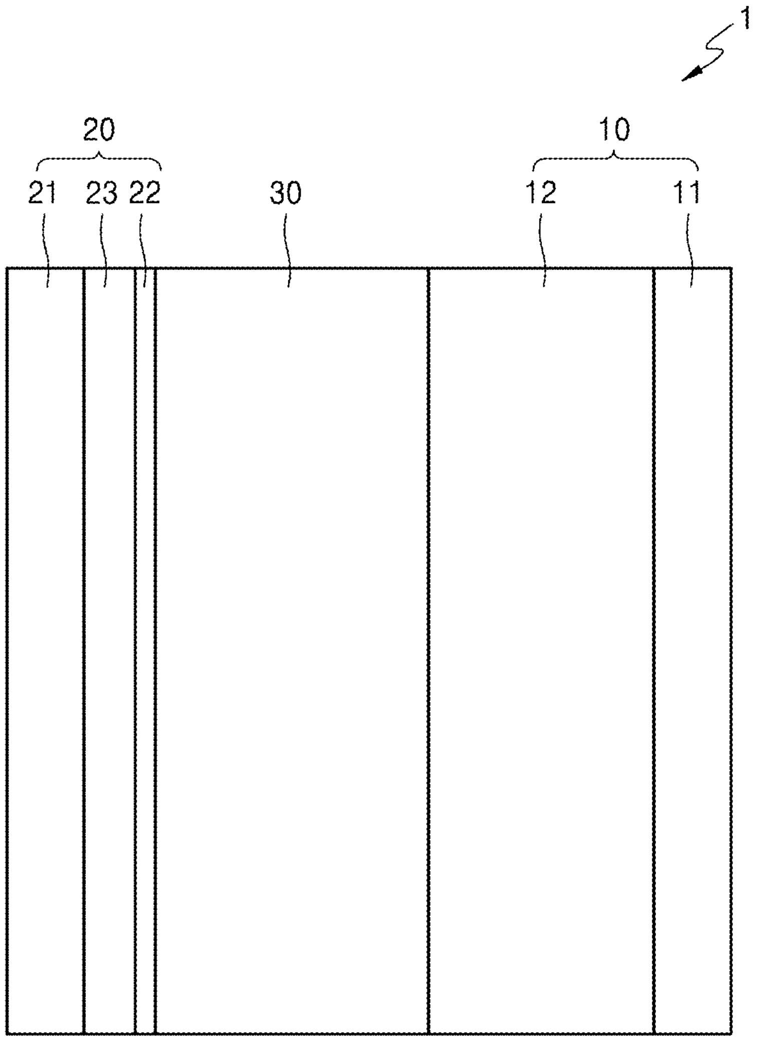
FIG. 1 is a cross-sectional view of an all-solid secondary battery, according to an aspect.

Reference will now be made in detail to aspects, examples of which are illustrated in the accompanying drawings, wherein like reference numerals refer to like elements throughout. In this regard, the present aspects may have different forms and should not be construed as being limited to the descriptions set forth herein. Accordingly, the aspects are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular aspects only and is not intended to be limiting. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element's as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An all-solid battery does not include a flammable organic solvent, and thus has a reduced risk of fire or explosion even when a short-circuit occurs. Accordingly, the all-solid battery may have increased safety as compared with a lithium-ion battery using a liquid electrolyte.

In an all-solid secondary battery including a solid electrolyte, lithium is locally deposited in the interface between a solid electrolyte layer and an anode layer, and the deposited lithium may grow and consequentially pass through the solid electrolyte layer, causing a short-circuit in the battery. While not wanting to be bound by theory, it is understood that when the solid electrolyte layer and the anode layer are simply stacked, an effective interfacial area between the solid electrolyte layer and the anode layer is smaller than an actual contact area therebetween. Accordingly, the interfacial resistance at the interface between the solid electrolyte layer and the anode layer may be increased, causing an increase in internal resistance of the battery and consequentially deteriorating cycle characteristics of the battery.

In an aspect, an all-solid battery is provided in which a short-circuit is prevented during charge and discharge, and cycle characteristics of the battery are improved.

Hereinafter, example aspects of an all-solid secondary battery and a method of manufacturing an all-solid secondary battery will be described in greater detail.

As used herein, the term “metal” refers to a metal element selected from Groups 1 to 16 of the Periodic Table of Elements, including the lanthanide elements and the actinide elements.

A “metalloid” refers to B, Si, Ge, As, Sb, Te, or a combination thereof.

“Argyrodite,” “argyrodite structure,” or “argyrodite-type structure” as used herein means that the compound has a crystal structure that is isostructural with argyrodite, $Ag_8GeS_6$.

A garnet or “garnet-type” compound is a compound having the same or similar crystal structure (e.g., isostructure) with a compound of the formula $X_3Y_2(SiO_4)_3$, wherein X is a divalent cation, such as $Ca^{2+}$, $Mg^{2+}$, $Fe^{2+}$, $Mn^{2+}$, or a combination thereof, and Y is a trivalent cation, such as $Al^{3+}$, $Fe^{3+}$, $Cr^{3+}$, or a combination thereof.

According to an aspect, an all-solid secondary battery may comprise: a cathode layer comprising a cathode active material layer; an anode layer; and a solid electrolyte layer comprising a solid electrolyte, wherein the solid electrolyte layer is disposed between the cathode layer and the anode layer, wherein the anode layer comprises an anode current collector, a first anode active material layer disposed on the anode current collector and in contact with the solid electrolyte layer; and a second anode active material layer disposed between the anode current collector and the first anode active material layer. The first anode active material layer comprises a first carbonaceous anode active material, the second anode active material layer includes a second carbonaceous anode active material, and a first intensity ratio ($I^1_D/I^1_G$) of an intensity of a D band peak to an intensity of a G band peak in a Raman spectrum of the first carbonaceous anode active material is less than as second intensity ratio ($I^2_D/I^2_G$) of an intensity of D band peak to an intensity of a G band peak of the second carbonaceous anode active material.

While not wanting to be bound by theory, it is understood that when the first intensity ratio ($I^1_D/I^1_G$) of the D band peak to the G band peak in the Raman spectrum of the first carbonaceous anode active material is less than the second intensity ratio ($I^2_D/I^2_G$) of the intensity of the D band peak to the intensity of the G band peak of the second carbonaceous anode active material, a content of defects in the first carbonaceous anode active material may be less than a content of defects in the second carbonaceous anode active material. Also, defects generated between the solid electrolyte layer and the first anode active material layer including the first carbonaceous anode active material may be reduced. Accordingly, localized lithium deposition in the interface between the solid electrolyte and the first anode active material layer may be suppressed. In addition, since the second anode active material layer is disposed on the first anode active material layer, and the second anode active material layer contains the second carbonaceous anode active material having more defects than the first carbonaceous anode active material, it is understood that the defects may serve as seeds for lithium deposition, thereby facilitating lithium deposition on the second anode active material layer, and lithium deposition (i.e., a formation of lithium layer) may be more uniform on the second anode active material layer. Due to the deposition of a uniform lithium layer between the solid electrolyte layer and the anode current collector, the all-solid secondary battery may be reversibly charged and discharged and have improved cycle characteristics.

All-Solid Secondary Battery

Referring to FIGS. 1 to 4, an all-solid secondary battery 1 according to an aspect may include: a cathode layer 10 including a cathode active material layer 12 and a cathode current collector 11; an anode layer 20; and a solid electrolyte layer 30 including a solid electrolyte, disposed between the cathode layer 10 and the anode layer 20. The anode layer 20 may include: an anode current collector 21; a first anode active material layer 22 disposed on the anode current collector 21 and contacting the solid electrolyte layer 30; and a second anode active material layer 23 disposed between the anode current collector 21 and the first anode active material layer 22. The first anode active material layer 22 may include a first carbonaceous anode active material, and the second anode active material layer 23 may include a second carbonaceous anode active material. A first intensity ratio ($I^1_D/I^1_G$) of an intensity of a D band peak to an intensity of a G band peak in a Raman spectrum of first carbonaceous anode active material may be less than a second intensity ratio ($I^2_D/I^2_G$) of an intensity of a D band peak to an intensity of a G band peak in a Raman spectrum of the second carbonaceous anode active material.

Anode Layer

Referring to FIGS. 1 to 4, the first intensity ratio ($I^1_D/I^1_G$) of the intensity of the D band peak to the intensity of the G band peak in the Raman spectrum of the first carbonaceous anode active material included in the first anode active material layer 22 may be, for example, about 0.95 or less, about 0.9 or less, about 0.85 or less, about 0.8 or less, or about 0.75 or less. The first intensity ratio ($I^1_D/I^1_G$) may be, for example, about 0.1 to about 0.95, about 0.2 to about 0.9, about 0.3 to about 0.85, about 0.4 to about 0.80, or about 0.5 to about 0.75. Since the first carbonaceous anode active material has an intensity ratio within these ranges, defects in the first anode active material layer may be reduced, and defects between the first anode active material layer and the solid electrolyte layer may also be reduced. As a result, the interfacial resistance between the first anode active material layer and the solid electrolyte layer may be reduced, and localized deposition of lithium may be suppressed.

the second intensity ratio ($I^2_D/I^2_G$) of the intensity of the D band peak to the intensity of the G band peak in the Raman spectrum of the second carbonaceous anode active material included in the second anode active material layer 23 may be, for example, about 1.0 or greater, about 1.05 or greater, or about 1.1 or greater. The second intensity ratio ($I^2_D/I^2_G$) of the intensity of the D band peak to the intensity of the G band peak in the Raman spectrum of the second carbonaceous anode active material included in the second anode active material layer 23 may be, for example, about 1.0 to about 10, about 1.05 to about 5, or about 1.1 to about 3. As the second carbonaceous anode active material has an intensity ratio within these ranges, defects in the second anode active material layer may be increased. As a result, lithium may be easily and uniformly deposited within the second anode active material layer and/or on a surface of the second anode active material layer.

The position of a D band peak center in the Raman spectrum of the first carbonaceous anode active material included in the first anode active material layer 22 may exhibit, for example, a blue shift of about 2 $cm^{-1}$ or greater, about 2.5 $cm^{-1}$ or greater, about 3 $cm^{-1}$ or greater, or about 3.5 $cm^{-1}$ or greater with respect to the position of a D band peak center in the Raman spectrum of the second carbonaceous anode active material included in the second anode active material layer 23. For example, the first carbonaceous anode active material may exhibit a blue shift of about 2 $cm^{-1}$ to about 4 $cm^{-1}$, or about 3 $cm^{-1}$ to about 4 $cm^{-1}$, or about 3.5 $cm^{-1}$ to about 4 $cm^{-1}$. A blue shift means shifting to a position with higher energy, i.e., with a greater wave number. In an embodiment in which the first carbonaceous anode active material has such a D band peak center position, a short-circuit of the all-solid secondary battery may be suppressed, and cycle characteristics thereof may further be improved.

The position of a G band peak center in the Raman spectrum of the first carbonaceous anode active material included in the first anode active material layer 22 may exhibit a blue shift of about 1 $cm^{-1}$ or greater, about 1.5 $cm^{-1}$ or greater, or about 2 $cm^{-1}$ or greater with respect to the position of a G band peak center in the Raman spectrum of the second carbonaceous anode active material included in the second anode active material layer 23. For example, the first carbonaceous anode active material may exhibit a blue shift of about 1 $cm^{-1}$ to about 3 $cm^{-1}$, or about 1 $cm^{-1}$ to about 2.5 $cm^{-1}$, or about 2 $cm^{-1}$ to about 2.5 $cm^{-1}$. In an embodiment in which the first carbonaceous anode active material has such a G band center position, a short-circuit of the all-solid secondary battery may be suppressed, and cycle characteristics thereof may be further improved.

A width of the D band peak, e.g., a full width at half maximum (FWHM), of the first carbonaceous anode active material included in the first anode active material layer 22 may be about 80% or less, about 75% or less, about 70% or less, about 65% or less, or about 60% or less of a width of the D band peak, e.g., a full width at half maximum (FWHM), of the second carbonaceous anode active material included in the second anode active material layer 23. For example, the width of the D band peak of the first carbonaceous anode active material may be about 50% to about 80%, or about 50% to about 70%, or about 50% to about 60% of the width of the D band peak of the second carbonaceous anode active material. While not wanting to be bound by theory, it is understood that when the first carbonaceous anode active material has such a D band peak width, a short-circuit of the all-solid secondary battery may be suppressed, and cycle characteristics thereof may further be improved.

At least one of the first carbonaceous anode active material or the second carbonaceous anode active material may be, for example, in a particle form. The particles of the first carbonaceous anode active material and/or the particles of the second carbonaceous anode active material may have an average particle diameter of, for example, about 4 micrometers (μm) or less, about 3 μm or less, about 2 μm or less, about 1 μm or less, or about 900 nanometers (nm) or less. The particles of the first carbonaceous anode active material and/or the particles of the second carbonaceous anode active material may have an average particle diameter of, for example, about 10 nm to 4 μm, about 10 nm to 3 μm, about 10 nm to 2 μm, about 10 nm to 1 μm, or about 10 nm to 900 nm. As the first carbonaceous anode active material and/or the second carbonaceous anode active material have an average particle diameter within these ranges, reversible absorption and/or desorption of lithium during charge and discharge may be further facilitated. In other aspects, the average particle diameter of the first carbonaceous anode active material and/or the second carbonaceous anode active material may be an arithmetic mean of the particle sizes obtained from a scanning electron microscope (SEM) image. The term "size" of a particle as used herein refers to an average diameter of particles in the case of a spherical particles or an average length of the major axes in the case of a non-spherical particles. The average diameter of particles refers to a median diameter ("D50") of particles, and the median diameter is defined as a particle diameter corresponding to 50 vol % (i.e., volume percentage) of a cumulative diameter distribution and refers to a particle diameter of 50% in samples. The median diameter ("D50") of particles may be measured using a particle size analyzer ("PSA").

At least one of the first carbonaceous anode active material included in the first anode active material layer 22 or the second carbonaceous anode active material included in the second anode active material layer 23 may include, for example, amorphous carbon. The amorphous carbon may be, for example, at least one of carbon black (CB), acetylene black (AB), furnace black (FB), ketjen black (KB), graphene, carbon nanotubes, or carbon nanofiber. However, aspects are not limited thereto. Any suitable amorphous carbon may be used.

At least one of the first anode active material layer 22 and the second anode active material layer 23 may consist of a carbonaceous material. For example, the first anode active material layer 22 may consist of the first carbonaceous anode active material, and/or the second anode active material layer 23 may consist of the second carbonaceous anode active material. When the first anode active material layer 22 and/or the second anode active material layer 23 consists of a carbonaceous material, the first anode active material layer 22 and/or the second anode active material layer 23 do not include a non-carbonaceous material, such as a metal, a metal oxide, or a ceramic.

The first anode active material layer 22 may further include, in addition to the first carbonaceous anode active material, a metal or metalloid anode active material. The second anode active material layer 23 may further include, in addition to the second carbonaceous anode active material, a metal or metalloid anode active material. The metal or metalloid anode active material may comprise, for example, at least one of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). However, embodiments are not limited thereto. Any suitable metal anode active material or metalloid anode active material which forms an alloy or a compound with lithium may be used.

The first anode active material layer 22 may include, for example, a single anode active material, thus the first anode active material layer 22 may include, for example, the first carbonaceous anode active materials) or a metal or a metalloid anode active material. Alternatively, the first anode active material layer 22 may include a composite of a plurality of different anode active materials. For example, the first anode active material layer 22 may include amorphous carbon alone, or in combination with at least one metal or metalloid of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). In other aspects, the first anode active material layer 22 may include a composite of amorphous carbon and at least one metal or metalloid anode active material of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). A weight ratio between the amorphous carbon and the metal or the metalloid in the composite may be, for example, about 10:1 to 1:2, about 5:1 to 1:1, or about 4:1 to 2:1. For example, the metal in the composite may be silver. However, aspects are not limited to these ranges, and the weight ratio may be selected according to the desired characteristics of the all-solid secondary battery 1. As the first anode active material layer 22 has a composition within these ratios, cycle characteristics of the all-solid secondary battery 1 may further be improved.

The second anode active material layer 23 may include, for example, a single anode active material from among the second carbonaceous active materials, or may be a composite of a plurality of different anode active materials. For example, the second anode active material layer 23 may include amorphous carbon alone, or in combination with at least one metal or metalloid of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). In other aspects, the second anode active material layer 23 may include a mixture of amorphous carbon and at least one metal or metalloid of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). A weight ratio of amorphous carbon and silver, or the like in the mixture may be, for example, about to 1:2, about 5:1 to 1:1, or about 4:1 to 2:1. However, aspects are not limited thereto. The weight ratio may be selected according to the desired characteristics of the all-solid secondary battery 1. As the second anode active material layer 23 has such a composition as above, the all-solid secondary battery 1 may have further improved characteristics.

The first anode active material included in the first anode active material layer 22 may include, for example, a composite of first particles and second particles. The first particles may consist of amorphous carbon and the second particles may consist of a metal or a metalloid. As used herein, "composite" refers to a material formed by combining two or more materials having different physical and/or chemical properties, wherein the composite has properties different from each material constituting the composite, and wherein particles of each material are at least microscopically separated and distinguishable from each other in a finished structure of the composite. The composite may be a product obtained through thermochemical reaction by thermal treatment or through mechanochemical reaction by mechanical milling of a mixture. A composite may be distinguished from a mixture of the first particles and the second particles or a mixture of the first particles and the second particles bound together by a binder. The metal or metalloid in the composite may include, for example, at least one of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). In an aspect, the metalloid is a semiconductor. The amount of the second particles may be about 1 weight percent (wt %) to about 60 wt %, about 8 wt % to about 60 wt %, about wt % to about 50 wt %, about 15 wt % to about 40 wt %, or about 20 wt % to about 30 wt %, with respect to a total weight of the composite. As the amount of the second particles is within these ranges, the all-solid secondary battery 1 may have, for example, further improved cycle characteristics.

The anode active material included in the second anode active material layer 23 may include, for example, a mixture of first particles and second particles. The first particles may consist of amorphous carbon and the second particles may consist of a metal or a metalloid. The mixture may be a product formed by mixing the first particles and the second particles, or by physically binding the first particles and the second particles together with a binder. The metal or the metalloid may include, for example, at least one of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). In an aspect, the metalloid is a semiconductor. The amount of the second particles may be about 8 wt % to about 60 wt %, about 10 wt % to about 50 wt %, about 15 wt % to about wt %, or about 20 wt % to about 30 wt %, with respect to a total weight of the mixture. As the amount of the second particles is within these ranges, for example, the all-solid secondary battery 1 may have further improved cycle characteristics.

In the all-solid secondary battery 1, for example, the amount of the metal or metalloid anode active material included in the second anode active material layer 23 and the amount of the metal or metalloid anode active material included in the first anode active material layer 22 may be different from each other. For example, the amount of the metal or metalloid anode active material included in the second anode active material layer 23 may be greater than the amount of the metal or metalloid anode active material included in the first anode active material layer 22. As the amount of the metal or metalloid anode active material included in the second anode active material layer 23 is greater than the amount of the metal or metalloid anode active material included in the first anode active material layer 22, lithium may be more easily deposited within and/or on the surface of the second anode active material layer 23. A weight ratio of the amount of the metal or metalloid anode active material included in the second anode active material layer 23 and the amount of the metal or metalloid anode active material included in the first anode active material layer 22 may be, for example, about 51:49 to about 99:1, about 55:45 to about 95:5, or about 60:40 to about 90:10.

The average particle diameter of the first particles consisting of amorphous carbon in the second anode active material layer 23 may be smaller than the average particle diameter of the first particles consisting of amorphous carbon in the first anode active material layer 22. The average particle diameter of the first particles consisting of amorphous carbon in the second anode active material layer 23 may be, for example, about 50% or less, about 40% or less, about 30% or less, about 20% or less, or about 10% or less of the average particle diameter of the first particles consisting of amorphous carbon in the first anode active material layer 22.

The average particle diameter of the second particles consisting of the metal or metalloid in the second anode active material layer 23 may be smaller than the average particle diameter of the second particles consisting of metal or metalloid in the first anode active material layer 22. The average particle diameter of the second particles consisting of the metal or metalloid in the second anode active material layer 23 may be, for example, about 50% or less, about 40% or less, about 30% or less, about 20% or less, or about 10% or less of the average particle diameter of the second particles consisting of the metal or metalloid in the first anode active material layer 22. Since the first particles and the second particles in the second anode active material layer 23 have reduced particle diameters relative to those in the first anode active material layer 22, the second particles (e.g., metal or metalloid particles) may be more uniformly dispersed in the second anode active material layer 23, and thus lithium may be more uniformly deposited inside of or on the surface of the second anode active material layer 23.

The first carbonaceous anode active material included in the first anode active material layer may form, for example, at least one of a covalent bond or an ionic bond with the solid electrolyte included in the solid electrolyte layer 30. The first carbonaceous anode active material included in the first anode active material layer may thus be bound to the solid electrolyte layer by at least one of a covalent bond or an ionic bond. For example, the formation of a covalent bond and/or an ionic bond may occur during the process of a thermally treating the precursors of the solid electrolyte layer 30 and the first anode active material layer 22. Since the first anode active material layer 22 forms covalent bonds and/or ionic bonds with the solid electrolyte layer 30, for example, the interfacial resistance between the first anode active material layer 22 and the solid electrolyte layer 30 may be reduced.

The first anode active material layer 22 may be, for example, an inorganic layer which does not include an organic material or organic compound. As used herein, an "organic compound" or "organic material" refers to a compound in which one or more atoms of carbon is covalently bound to hydrogen atom(s), and optionally another element. An organic compound or organic material does not include the carbonaceous materials disclosed herein. For example, the first anode active material layer 22 does not include an organic binder such as a polymer binder. In other words, the first anode active material layer 22 maybe an inorganic layer consisting of an inorganic material. Since the first anode active material layer 22 is an inorganic layer including an inorganic carbonaceous material and/or a metal or metalloid material, for example, side reactions during charge and discharge processes may be suppressed. For example, the first anode active material layer 22 may be an inorganic carbon layer consisting of amorphous carbon. For example, the first anode active material layer 22 may be an inorganic carbon-metal or metalloid composite layer consisting of amorphous carbon and a metal or metalloid.

The first carbonaceous anode active material included in the first anode active material layer 22 may be, for example, a sintered product of a carbonaceous precursor. That is, the first carbonaceous anode active material may be a product obtained by thermal treatment of a carbonaceous precursor. The carbonaceous precursor of the first carbonaceous anode active material may be, for example, the second carbonaceous anode active material. For example, the first carbonaceous anode active material may be obtained by thermal treatment of the second carbonaceous anode active material included in the second carbonaceous anode active material layer 23. The first carbonaceous anode active material may be, for example, a thermal treatment product, i.e., a sintered product, of the second carbonaceous anode active material. Accordingly, for example, the first anode active material layer 22 may be sintered with the solid electrolyte layer 23 during a thermal treatment process to form a single body with the solid electrolyte layer 30. Also, during the thermal treatment process, any organic material such as a binder included in the carbonaceous precursor, may be removed via carbonization or vaporization during the thermal decomposition process, and thus only the carbonaceous material and/or metal material remains.

A thickness of the first anode active material layer 22 may be about 50% or less, about 40% or less, about 30% or less, about 20% or less, or about 10% or less of the total thickness of the cathode active material layer 12. For example, the thickness of the first anode active material layer 22 may be about 1% to about 50%, or about 1% to about 40%, or about 1% to about 30% of the total thickness of the cathode active material layer 12. As the thickness of the first anode active material layer 22 decreases relative to the thickness of the cathode active material layer, the all-solid secondary battery may have improved energy density. The thickness of the first anode active material layer 22 may be, for example, about 10 nm to about 10 μm, about 100 nm to about 10 μm, about 200 nm to about 10 μm, about 300 nm to about 10 μm, about 400 nm to about 10 μm, about 500 nm to about 10 μm, about 1 μm to about 10 μm, about 1 μm to about 9 μm, about 1 μm to about 8 μm, about 2 μm to about 7 μm, or about 3 μm to about 7 μm. When the first anode active material layer 22 has a thickness within these ranges, a short-circuit in the all-solid secondary battery may be suppressed, and cycle characteristics may be improved. When the thickness of the first anode active material layer 22 is too small, the first anode active material layer 22 may not effectively serve as an anode active material layer. When the thickness of the first anode active material layer 22 is too large, the all-solid secondary battery 1 may have reduced energy density and may have increased internal resistance due to the first anode active material layer 22, and thus it may be difficult for the all-solid secondary battery 1 to have improved cycle characteristics.

The thickness of the second anode active material layer 23 may be, for example, about 50% or less, about 40% or less, about 30% or less, about 20% or less, or about 10% or less of the total thickness of the cathode active material layer. For example, the thickness of the second anode active material layer 23 may be about 1% to about 50%, or about 1% to about 40%, or about 1% to about 30% of the total thickness of the cathode active material layer 12. As the thickness of the second anode active material layer 23 is less than the thickness of the cathode active material layer, the all-solid secondary battery may have improved energy density.

The thickness of the second anode active material layer 23 may be, for example, about 1 μm to about 50 μm, about 5 μm to about 45 μm, about 10 μm to about 40 μm, about 15 μm to about 35 μm, or about 20 μm to about 30 μm. When the second anode active material layer 23 has a thickness within these ranges, a short-circuit in the all-solid secondary battery may be suppressed, and cycle characteristics may be improved. When the thickness of the second anode active material layer 23 is too small, lithium dendrites formed between the second anode active material layer 23 and the anode current collector 21 may collapse the second anode active material layer 23, and thus it may be difficult for the all-solid secondary battery 1 to have improved cycle characteristics. When the thickness of the second anode active material layer 23 is excessively increased, the all-solid secondary battery 1 may have reduced energy density and may have increased internal resistance due to the second anode active material layer 23, and thus it may be difficult for the all-solid secondary battery 1 to have improved cycle characteristics.

For example, the thickness of the first anode active material layer 22 may be less than the thickness of the second anode active material layer 23. The thickness of the first anode active material layer 22 may be about 50% or less, about 40% or less, about 30% or less, about 20% or less, or about 10% or less of the thickness of the second anode active material layer 23. For example, the thickness of the first anode active material layer 22 may be about 5% to about 50%, or about 10% to about 40%, or about 20% to about 30% of the thickness of the second anode active material layer 23. When the first anode active material layer 22 has a thickness within these ranges, a short-circuit in the all-solid secondary battery may be suppressed, and cycle characteristics may be improved.

For example, the first anode active material layer 22 may be formed on the solid electrolyte layer 30 using a film formation method such as spin coating, drop coating, spray coating, pyrolysis, or solution filtration, and then a thermal treatment may be applied. However, aspects are not limited thereto. Any wet method suitable for forming the first anode active material layer 22 may be used. In other aspects, the first anode active material layer 22 may be disposed on the solid electrolyte layer 30 using vacuum deposition, sputtering, or plating. However, aspects are not limited to these methods. Any dry method suitable for forming the first anode active material layer 22 may be used.

At least one of the first anode active material layer 22 or the second anode active material layer 23 may further include, for example, a binder.

For example, the second anode active material layer 23 may include a binder. The binder may be, for example, at least one of a styrene-butadiene rubber (SBR), polytetrafluoroethylene, polyvinylidene fluoride, polyethylene, a vinylidene fluoride/hexafluoropropylene copolymer, polyacrylonitrile, or polymethylmethacrylate. However, aspects are not limited thereto. Any suitable binder may be used. The binder may be a single binder or may include a plurality of different binders.

When the second anode active material layer 23 includes a binder, the second anode active material layer 23 may be stabilized on the anode current collector 21. Also, despite a volume change and/or relative position change of the second anode active material layer 23 during a charge and discharge process, cracking of the second anode active material layer 23 may be suppressed. For example, when the second anode active material layer 23 does not include a binder, the second anode active material layer 23 may be easily separated from the anode current collector 21. If a portion of the second anode active material layer 23 is separated from the anode current collector 21, the anode current collector 21 may be exposed and may contact the solid electrolyte layer 30, and thus a short circuit is more likely to occur. For example, the second anode active material layer 23 may be formed by coating a slurry on the anode current collector 21, and drying the same. The slurry may include the ingredients for forming the second anode active material layer 23. If a binder is included in the second anode active material layer 23, the anode active material may be stably dispersed in the slurry. For example, when the slurry is coated on the anode current collector 21 using screen printing, clogging of a screen (for example, clogging by aggregates of the anode active material) can be suppressed.

For example, the anode current collector 21 may consist of a material which does not react with lithium to form an alloy or compound. The material of the anode current collector 21 may be, for example, at least one metal of copper (Cu), stainless steel (SUS), titanium (Ti), iron (Fe), cobalt (Co), or nickel (Ni). However, aspects are not limited thereto. Any material suitable as an anode current collector may be used. The anode current collector 21 may include one of the above-listed metals or may be an alloy or a compound of two or more of the above-listed metals. The anode current collector 21 may be, for example, in the form of a plate or a foil.

The second anode active material layer 23 of the all-solid secondary battery 1 may further include an additive(s), for example, at least one of a filler, a dispersing agent, or an ionic conducting agent.

In the all-solid secondary battery 1, for example, the second anode active material layer 23 may include a second carbonaceous anode active material and a metal or metalloid anode active material, and the first anode active material layer 22 may consist of a first carbonaceous anode active material. That is, the first anode active material layer 22 does not include a metallic material, and specifically, does not include a metal or metalloid anode active material. As the all-solid secondary battery 1 has this structure, a short circuit of the all-solid secondary battery 1 may be suppressed, and cycle characteristics may be improved.

In other aspects, in the all-solid secondary battery 1, the second anode active material layer 23 may consist of a second carbonaceous anode active material, and the first anode active material layer 22 may include a first carbonaceous anode active material and a metal or metalloid anode active material. That is, the second anode active material layer 23 does not include a metallic material and specifically, does not include a metal or metalloid active material. As the all-solid secondary battery 1 has this structure, a short-circuit in the all-solid secondary battery 1 may be suppressed, and cycle characteristics may be improved.

Figure 2:
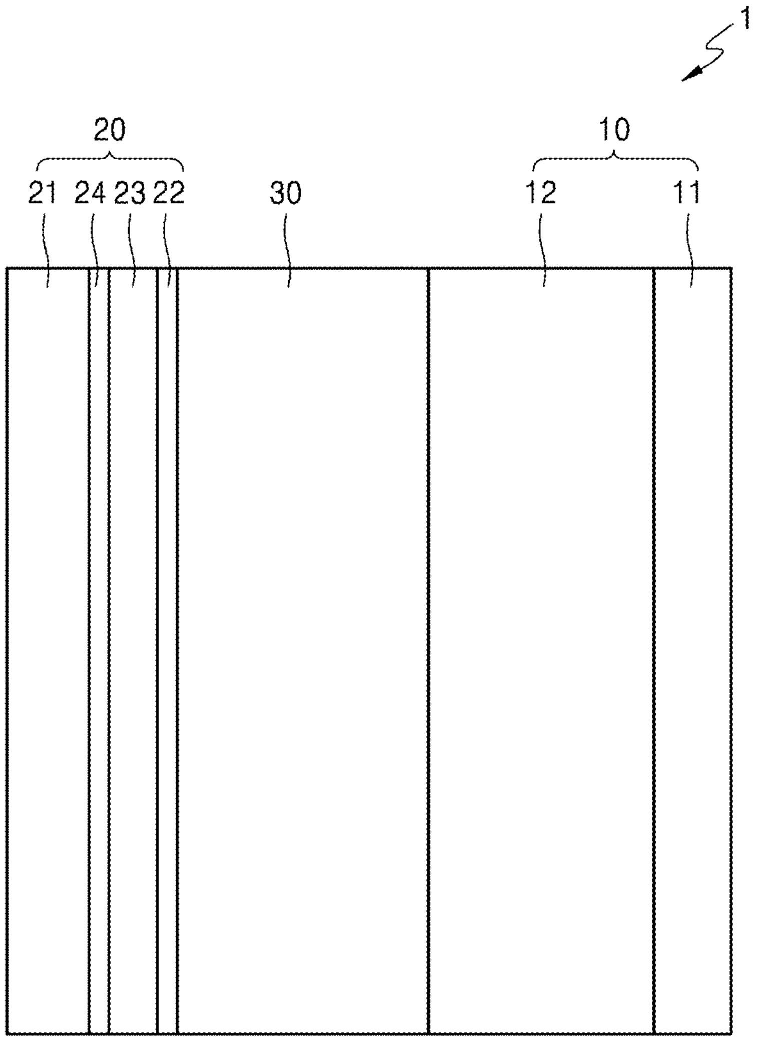
FIG. 2 is a cross-sectional view of an all-solid secondary battery, according to an example aspect.

Referring to FIG. 2, for example, the all-solid secondary battery 1 may further include, on the anode current collector 21, a thin film 24 including an element alloyable with lithium. The thin film 24 may be disposed between the anode current collector 21 and the second anode active material layer 23. For example, the thin film 24 may include an element alloyable with lithium. The element (metal) alloyable with lithium may be, for example, at least one of gold, silver, zinc, tin, indium, silicon, aluminum, or bismuth. However, aspects are not limited thereto, and any element alloyable with lithium may be used. The thin film 24 may consist of one of these metals or an alloy of two or more of the different metals. As the thin film 24 is disposed on the anode current collector 21, for example, a third anode active material layer (not shown) deposited between the thin film 24 and the second anode active material layer 23 may have a more planar form, and the all-solid secondary battery 1 may have further improved cycle characteristics.

The thin film 24 may have a thickness of, for example, about 1 nm to about 800 nm, about 10 nm to about 700 nm, about 50 nm to about 600 nm, or about 100 nm to about 500 nm. When the thickness of the thin film 24 is less than 1 nm, it may be difficult for the thin film 24 to function properly.

When the thickness of the thin film 24 is too great, the thin film 24 itself may absorb lithium so that a deposition amount of lithium on the anode may be reduced and the all-solid secondary battery may have reduced energy density, and thus have deteriorated cycle characteristics. The thin film 24 may be disposed on the anode current collector 21 using, for example, vacuum deposition, sputtering, or plating. However, aspects are not limited to these methods. Any suitable method may be used to form the thin film 24.

Figure 3:
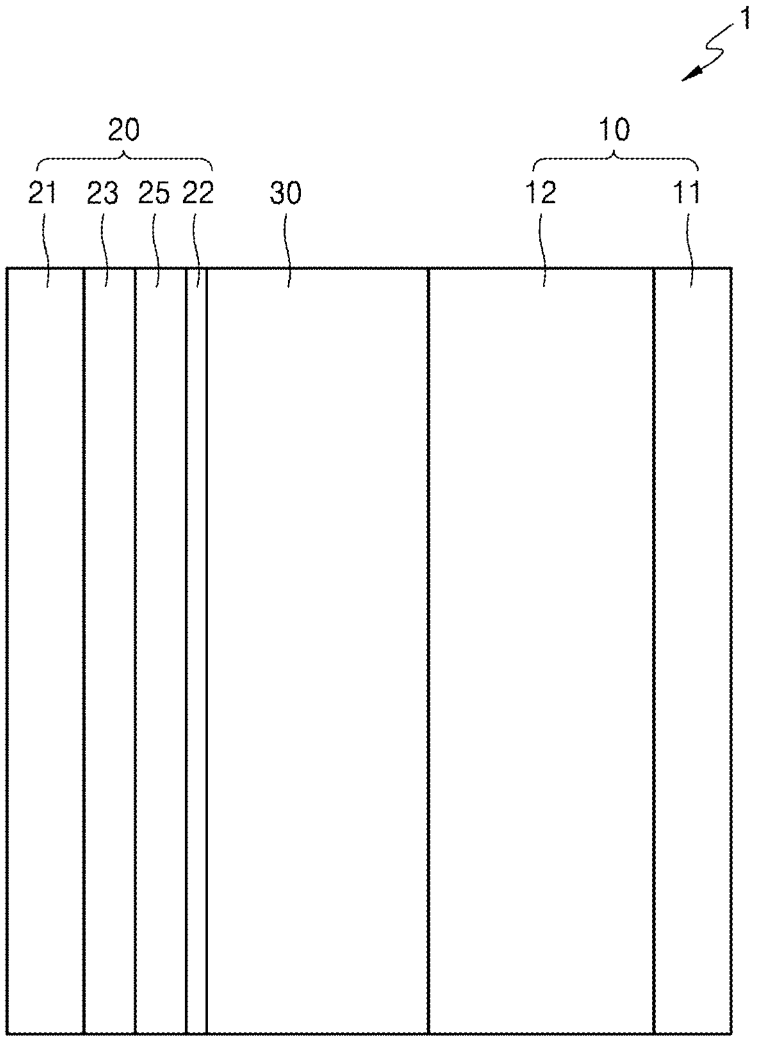
FIG. 3 is a cross-sectional view of an all-solid secondary battery, according to an example aspect.
Figure 4:
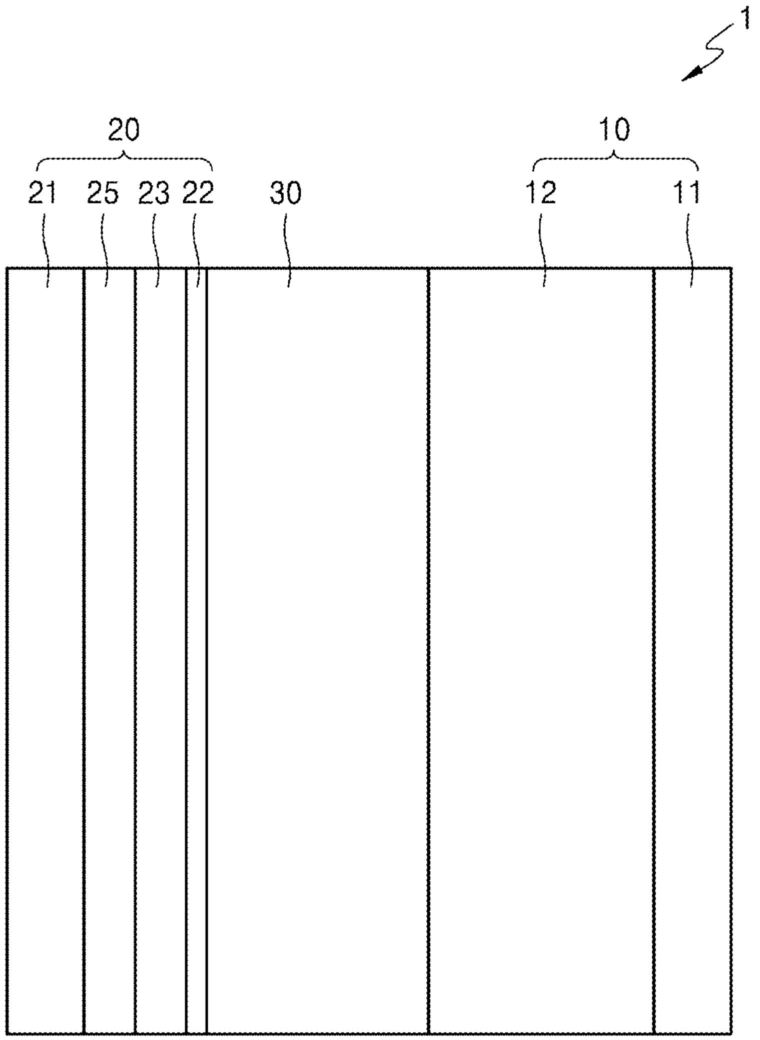
FIG. 4 is a cross-sectional view of an all-solid secondary battery, according to an example aspect.

Referring to FIGS. 3 and 4, an all-solid secondary battery 1 according to an aspect may further include a third anode active material layer 25, between the anode current collector 21 and the second anode active material layer 23 (FIG. 4) or between the first anode active material layer 22 and the second anode active material layer 23 (FIG. 3). The third anode active material layer 25 may be deposited during charging of the all-solid secondary battery 1. The third anode active material layer 25 may be a metal layer including lithium or a lithium alloy. Accordingly, the third anode active material layer 25, as a metal layer including lithium or a lithium alloy, may function as a lithium reservoir. The lithium alloy may be, for example, at least one of a Li—Al alloy, a Li—Sn alloy, a Li—In alloy, a Li—Ag alloy, a Li—Au alloy, a Li—Zn alloy, a Li—Ge alloy, or a Li—Si alloy. However, aspects are not limited to these alloys, and any lithium alloy suitable for an all-solid secondary battery may be used. The third anode active material layer 25 may consist of lithium, a single lithium alloy, or a combination of various alloys.

The thickness of the third anode active material layer 25 is not specifically limited, and may be, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness of the third anode active material layer 23 is too thin, the third anode active material layer 25 may not function as a lithium reservoir. When the thickness of the third anode active material layer 25 is too thick, the all-solid secondary battery 1 may be increased in mass and volume, and cycle characteristics may be degraded. The third anode active material layer 25 may be, for example, a metal foil having a thickness within the above-described ranges.

For example, the third anode active material layer 25 of the all-solid secondary battery 1 may be disposed, during assembly of the all-solid secondary battery 1, between the anode current collector 21 and the second anode active material layer 23, or between the first anode active material layer 22 and the second anode active material layer 23. In another aspect, the third anode active material layer 25 of the all-solid secondary battery 1 may be precipitated after assembly and during charging of the all-solid secondary battery 1, and may be disposed between the anode current collector 21 and the second anode active material layer 23, or between the first anode active material layer 22 and the second anode active material layer 23.

In the case where the third anode active material layer 25 is disposed during assembly of the all-solid secondary battery 1, between the anode current collector 21 and the second anode active material layer 23, or between the first anode active material layer 22 and the second anode active material layer 23, the third anode active material layer 25 (which is a metal layer including lithium), may serve as a lithium reservoir. The all-solid secondary battery 1 including the third anode active material layer 25 may have further improved cycle characteristics. For example, during the assembly of the all-solid secondary battery 1, a lithium foil as the third anode active material layer 25 may be disposed between the anode current collector 21 and the second anode active material layer 23, or between the first anode active material layer 22 and the second anode active material layer 23.

In the case where the third anode active material layer 25 is disposed after assembly by charging of the all-solid secondary battery 1, the all-solid secondary battery 1 may have increased energy density since the third anode active material layer 25 is not present at a time of assembly. For example, the all-solid secondary battery 1 may be charged to exceed the charge capacity of at least one of the first anode active material layer 22 or the second anode active material layer 23. That is, the first anode active material layer 22 and/or the second anode active material layer 23 may be overcharged. At an initial charging stage, lithium may be absorbed into at least one of the first anode active material layer 22 or the second anode active material layer 23. That is, the anode active material in at least one of the first anode active material layer 22 or the second anode active material layer 23 may form an alloy or a compound with lithium ions as they move from the cathode layer 10 during charge of the all-solid secondary battery. When the all-solid secondary battery 1 is overcharged, i.e., charged greater than the capacity of the first anode active material layer 22 and/or the second anode active material layer 23, for example, lithium may be precipitated on a rear surface of the second anode active material layer 23, i.e., between the anode current collector 21 and the second anode active material layer 23, thus forming a metal layer corresponding to the third anode active material layer 25. In another aspect, when the all-solid secondary battery 1 is charged over the capacity of the second anode active material layer 23, for example, lithium may be precipitated on a front surface of the second anode active material layer 23, i.e., between the first anode active material layer 22 and the second anode active material layer 23, thus forming a metal layer corresponding to the third anode active material layer 25.

The third anode active material layer 25 may be a metal layer including lithium (i.e., metal lithium) as a major component. This may be attributed to, for example, the fact that the anode active material in the first anode active material layer 22 and the second anode active material layer 23 includes a material capable of forming an alloy or a compound with lithium. During discharge, lithium in at least one of the first anode active material layer 22, the second anode active material layer 23, or the third anode active material layer 25, i.e., lithium metal layer, may be ionized and then move towards the cathode layer 10. Accordingly, the all-solid secondary battery 1 may use lithium as the anode active material. Since at least one of the first anode active material layer 22 or the second anode active material layer 23 coat the third anode active material layer 25, the at least one of the first anode active material layer 22 or the second anode active material layer 23 may function as a protective layer for the third anode active material layer 25, i.e., metal layer, and at the same time suppress precipitation and growth of lithium dendrites. Accordingly, a short-circuit and reduction in capacity of the all-solid secondary battery 1 may be suppressed, and cycle characteristics of the all-solid secondary battery 1 may be improved. In the case where the third anode active material layer 25 is disposed through charging of the all-solid secondary battery 1 after assembly, the anode current collector 21, the first anode active material layer 22, the second anode active material layer 23, and regions therebetween may be, for example, Li-free regions which do not include lithium (Li) in an initial state or a post-discharge state of the all-solid secondary battery.

(Solid Electrolyte Layer)

Referring to FIGS. 1 to 4, the solid electrolyte layer 30 between the cathode layer 10 and the anode layer 20 may contain a solid electrolyte.

The solid electrolyte may be, for example, an oxide-containing solid electrolyte. The oxide-containing solid electrolyte may be at least one of $Li_{1+x+y}Al_xTi_{2-x}Si_yP_{3-y}O_{12}$ (wherein 0<x<2 and 0≤y<3), $BaTiO_3$, $Pb(Zr_aTi_{1-a})O_3$ (where 0≤a≤1) (PZT), $Pb_{1-x}La_xZr_{1-y}Ti_yO_3$ (PLZT) (wherein 0≤x<1 and 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$ (wherein 0<x<2 and 0<y<3), $Li_xAl_yTi_z(PO_4)_3$ (wherein 0<x<2, 0≤y<1, and 0<z<3), $Li_{1+x+y}(Al_aGa_{1-a})_x(Ti_bGe_{1-b})_{2-x}Si_yP_{3-y}O_{12}$ (wherein 0≤x≤1, 0≤y≤1, 0≤a≤1, and 0≤b≤1), $Li_xLa_yTiO_3$ (wherein 0<x<2 and 0<y<3), $Li_2O$, LiOH, $Li_2CO_3$, $LiAlO_2$, $Li_2O$—$Al_2O_3$—$SiO_2$—$P_2O_5$—$TiO_2$—$GeO_2$, and $Li_{3+x}La_3M_2O_{12}$ (wherein M is Te, Nb, or Zr, and x is 1≤x≤10). The solid electrolyte may be prepared using, for example, sintering.

The oxide-containing solid electrolyte may be, for example, at least one Garnet-type solid electrolyte of $Li_7La_3Zr_2O_{12}$ (LLZO) or $Li_{3+x}La_3Zr_{2-a}M_aO_{12}$ (M-doped LLZO, wherein M is Ga, W, Nb, Ta, or Al, 1≤x≤10, and 0≤a<2).

In another aspect, the solid electrolyte may be, for example, a sulfide-containing solid electrolyte. The sulfide-containing solid electrolyte may be, for example, at least one of $Li_2S$—$P_2S_5$, $Li_2S$—$P_2S_5$—LiX (wherein X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (wherein m and n are each independently a positive number, and Z is Ge, Zn, or Ga), $Li_2S$—$GeS_2$, $Li_2S$—$SiS_2$—$Li_3PO_4$, $Li_2S$—$SiS_2$—$Li_pMO_q$ (wherein p and q are each independently a positive number, and M is selected from P, Si, Ge, B, Al, Ga, and In) $Li_{7-x}PS_{6-x}Cl_x$ (wherein 1≤x≤2), $Li_{7-x}PS_{6-x}Br_x$ (wherein 0≤x≤2), or $Li_{7-x}PS_{6-x}I_x$ (wherein 0≤x≤2). The sulfide-containing solid electrolyte may be prepared using a precursor source material, for example, at least one of $Li_2S$ or $P_2S_5$, and melt quenching or mechanical milling the precursor source material. After these treatments, a thermal treatment may further be performed. The sulfide-containing solid electrolyte may be amorphous, crystalline, or a mixed state thereof.

In addition, the sulfide-containing solid electrolyte may be, for example, any of the above-listed sulfide-containing solid electrolyte materials and including at least sulfur (S), phosphorous (P), and lithium (Li) as constituent elements. For example, the sulfide-containing solid electrolyte may be a material including $Li_2S$—$P_2S_5$. When a sulfide-containing solid electrolyte including $Li_2S$—$P_2S_5$ is used, a mixed mole ratio of $Li_2S$ to $P_2S_5$ ($Li_2S$:$P_2S_5$) may be, for example, in a range of about 50:50 to about 90:10, or about 60:40 to about 90:10, or about 70:30 to about 80:20.

The sulfide-containing solid electrolyte may include, for example, an argyrodite-type solid electrolyte represented by Formula 1.

$$Li^{+}_{12-n-x}A_{n+}X^{2-}_{6-x}Y^{-}_{x} \quad \text{Formula 1}$$

In Formula 1, A may be P, As, Ge, Ga, Sb, Si, Sn, Al, In, Ti, V, Nb, or Ta, X may be S, Se, or Te, Y may be Cl, Br, I, F, CN, OCN, SCN, or $N_3$, 1≤n≤5, and 0≤x≤2.

The sulfide-containing solid electrolyte may be a compound having an argyrodite-type crystal structure. The compound having an argyrodite-type crystal structure may include, for example, at least one of $Li_{7-x}PS_{6-x}Cl_x$ (wherein 0≤x≤2), $Li_{7-x}PS_{6-x}Br_x$ (wherein 0≤x≤2), or $Li_{7-x}PS_{6-x}I_x$ (wherein 0≤x≤2). In particular, the sulfide-containing solid electrolyte may be an argyrodite-type compound including at least one of $Li_6PS_5Cl$, $Li_6PS_5Br$, or $Li_6PS_5I$.

For example, the solid electrolyte layer 30 may further include a binder. The binder in the solid electrolyte layer 30 may be, for example, at least one of a styrene-butadiene rubber (SBR), polytetrafluoroethylene (PTFE), polyvinylidene fluoride (PVDF), or polyethylene. However, aspects are not limited thereto. Any suitable binder may be used. The binder of the solid electrolyte layer 30 may be the same as, or different from, the binders of the cathode active material layer 12 and the second anode active material layer 23.

Cathode Layer

The cathode layer 10 may include a cathode current collector 11 and the cathode active material layer 12.

The cathode current collector 11 may be a plate or foil including at least one of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 may include, for example, a cathode active material.

The cathode active material may be capable of intercalation and deintercalation of lithium ions. The cathode active material may be, for example, at least one of a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, or lithium iron phosphate; a nickel sulfide; a copper sulfide; lithium sulfide; iron oxide; or vanadium oxide. However, aspects are not limited thereto. Any suitable cathode active material may be used. These cathode active materials may be used alone or in a combination of at least two cathode active materials.

The cathode active material may be, for example, a compound represented by the following formula: $Li_aA_{1-b}B'_bD_2$ (wherein 0.90≤a≤1, and 0≤b≤0.5); $Li_aE_{1-b}B'_bO_{2-c}D_c$ (wherein 0.90≤a≤1, 0≤b≤0.5, and 0≤c≤0.05); $LiE_{2-b}B'_bO_{4-c}D_c$ (wherein 0≤b≤0.5, and 0≤c≤0.05); $Li_aNi_{1-b-c}Co_bB'_cD_\alpha$ (wherein 0.90≤a≤1, 0≤b≤0.5, 0≤c≤0.05, and 0<α≤2); $Li_aNi_{1-b-c}Co_bB'_cO_{2-\alpha}F'_\alpha$ (wherein 0.90≤a≤1, 0≤b≤0.5, 0≤c≤0.05, and 0<α<2); $Li_aNi_{1-b-c}Co_bB'_cO_{2-\alpha}F'_\alpha$ (wherein 0.90≤a≤1, 0≤b≤0.5, 0≤c≤0.05, and 0<α<2); $Li_aNi_{1-b-c}Mn_bB'_cD_\alpha$ (wherein 0.90≤a≤1, 0≤b≤0.5, 0≤c≤0.05, and 0<α≤2); $Li_aNi_{1-b-c}Mn_bB'_cO_{2-\alpha}F'_\alpha$ (wherein 0.90≤a≤1, 0≤b≤0.5, 0≤c≤0.05, and 0<α<2); $Li_aNi_{1-b-c}Mn_bB'_cO_{2-\alpha}F'_2$ (wherein 0.90≤a≤1, 0≤b≤0.5, 0≤c≤0.05, and 0<α<2); $Li_aNi_bE_cG_dO_2$ (wherein 0.90≤a≤1, 0≤b≤0.9, 0≤c≤0.5, and 0.001≤d≤0.1); $Li_aNi_bCo_cMn_dGeO_2$ (wherein 0.90≤a≤1, 0≤b≤0.9, 0≤c≤0.5, 0≤d≤0.5, and 0.001≤e≤0.1); $Li_aNiG_bO_2$ (wherein 0.90≤a≤1, and 0.001≤b≤0.1); $Li_aCoG_bO_2$ (wherein 0.90≤a≤1, and 0.001≤b≤0.1); $Li_aMnG_bO_2$ (wherein 0.90≤a≤1, and 0.001≤b≤0.1); $Li_aMn_2GbO_4$ (wherein 0.90≤a≤1, and 0.001≤b≤0.1); $QO_2$; $LiOS_2$; $V_2O_5$; $LiV_2O_5$; $LiI'O_2$; $LiNiVO_4$; $Li_{(3-f)}J_2(PO_4)_3$ (wherein 0≤f≤2); $Li_{(3-f)}Fe_2(PO_4)_3$ (wherein 0≤f≤2); and $LiFePO_4$. In the formulas above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The cathode active material may further include a surface coating layer (hereinafter, also referred to as "coating layer"). Alternatively, a mixture of a compound without a coating layer and a compound having a coating layer, the compounds being selected from the compounds listed above, may be used. In an aspect, the coating layer on the surface of such compounds may include at least one compound of a coating element selected from the group consisting of an oxide, a hydroxide, an oxyhydroxide, an oxycarbonate, or an hydroxycarbonate of the coating element. In an aspect, the compounds for the coating layer may be amorphous or crystalline. In an aspect, the coating element for the coating layer may be at least one of magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), or zirconium (Zr). In an aspect, the coating layer may be formed using any method that does not adversely affect the physical properties of the cathode active material. For example, the coating layer may be formed using a spray coating method, a dipping method, or the like. The above-mentioned coating methods are understood by one of ordinary skill in the art, and thus a detailed description thereof will be omitted.

The cathode active material may include, for example a lithium transition metal oxide having a layered rock salt-type structure among the above-listed lithium transition metal oxides. The term "layered rock salt-type structure" used herein refers to a structure in which oxygen atomic layers and metal atomic layers are alternately and regularly disposed in a (111) crystallographic direction, with each atomic layer forming a two-dimensional (2D) plane. A "cubic rock salt-type structure" refers to a sodium chloride (NaCl)-type crystal structure, and in particular, a structure in which face-centered cubic (fcc) lattices formed by respective cations and anions are disposed in a way that ridges of the unit lattices are shifted by ½. The lithium transition metal oxide having such a layered rock salt-type structure may be, for example, a ternary lithium transition metal oxide such as $LiNi_xCo_yAl_zO_2$ (NCA) or $LiNi_xCo_yMn_zO_2$ (NCM) (wherein 0<x<1, 0<y<1, 0<z<1, and x+y+z=1). When the cathode active material includes such a ternary lithium transition metal oxide having a layered rock salt-type structure, the all-solid secondary battery 1 may have further improved energy density and thermal stability. For example, The lithium transition metal oxide having such a layered rock salt-type structure may be, for example, $LiNi_xCo_yMn_zO_2$ (0.6≤x≤0.95, 0<y≤0.2, 0<z≤0.2, and x+y+z=1), $LiNi_xCo_yAl_zO_2$ (0.6≤x≤0.95, 0<y≤0.2, 0<z≤0.2, and x+y+z=1), $LiNi_xCo_yAl_vMn_wO_2$ (0.6≤x≤0.95, 0<y≤0.2, 0<v≤0.2, 0<w≤0.2, and x+y+v+w=1), $LiNi_xCo_yMn_zO_2$ (0.8≤x≤0.95, 0<y≤0.2, 0<z≤0.2, and x+y+z=1), $LiNi_xCo_yAl_zO_2$ (0.8≤x≤0.95, 0<y≤0.2, 0<z≤0.2, and x+y+z=1), $LiNi_xCo_yAl_vMn_wO_2$ (0.8≤x≤0.95, 0<y≤0.2, 0<v≤0.2, 0<w≤0.2, and x+y+v+w=1), $LiNi_xCo_yMn_zO_2$ (0.85≤x≤0.95, 0<y≤0.2, 0<z≤0.2, and x+y+z=1), $LiNi_xCO_yAl_zO_2$ (0.85≤x≤0.95, 0<y≤0.2, 0<z≤0.2, and x+y+z=1), $LiNi_xCo_yAl_vMn_wO_2$ (0.85≤x≤0.95, 0<y≤0.2, 0<0.2, 0<w≤0.2, and x+y+v+w=1) or the like.

The cathode active material may include a coating layer as described above. The coating layer may be any suitable coating layer for a cathode active material of an all-solid secondary battery. The coating layer may include, for example, $Li_2O—ZrO_2$.

When the cathode active material includes, for example, a ternary lithium transition metal oxide including Ni, such as NCA or NCM, the all-solid secondary battery 1 may have an increased capacity density and elution of metal ions from the cathode active material may be reduced in a charged state. As a result, the all-solid secondary battery 1 may have improved cycle characteristics.

The cathode active material may be in the form of particles having, for example, a true-spherical shape or an oval-spherical shape. The particle diameter of the cathode active material is not particularly limited, and may be in a range applicable to a cathode active material of a commercially available lithium secondary battery. An amount of the cathode active material in the cathode layer 10 is not particularly limited, and may be in a range applicable to a cathode active material of a commercially available lithium secondary battery.

The cathode layer 10 may further include, in addition to a cathode active material as described above, at least one additive, for example, a conducting agent, a binder, a filler, a dispersing agent, an auxiliary ionic conducting agent, or a coating agent. The conducting agent may be, for example, at least one of graphite, carbon black, acetylene black, Ketjen black, carbon fibers, or a metal powder. The binder may be, for example, at least one of a styrene-butadiene rubber (SBR), polytetrafluoroethylene, polyvinylidene fluoride, or polyethylene. The filler, the dispersing agent, the auxiliary ionic conducting agent, and the coating agent, which may be added to the cathode layer 10, may be any material suitable for use in a cathode of an all-solid secondary battery.

The cathode layer 10 may further include a solid electrolyte. The solid electrolyte included in the cathode layer 10 may be similar to or different from the solid electrolyte included in the solid electrolyte layer 30. As a detailed description of the solid electrolyte of the cathode layer 10, the above-detailed description of the solid electrolyte layer 30 may be referred to.

The solid electrolyte included in the cathode layer 10 may be, for example, a sulfide-containing solid electrolyte. This sulfide-containing solid electrolyte may also be used in the solid electrolyte layer 30.

In another aspect, the cathode layer 10 may include, for example, a liquid electrolyte. For example, the cathode layer may be soaked with the liquid electrolyte. The liquid electrolyte may include a lithium salt and at least one of an ionic liquid or a polymeric ionic liquid. The liquid electrolyte may be non-volatile. The ionic liquid may refer to a salt in a liquid state at room temperature or a fused salt at room temperature, each having a melting point equal to or below room temperature and consisting of ions. The ionic liquid may include at least one cation and at least one anion. The cation may be at least one of an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, or a triazolium cation, and the anion may be at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, or $(CF_3SO_2)_2N^-$. The ionic liquid may be, for example, at least one of N-methyl-N-propylpyrrolidinium bis(trifluoromethylsulfonyl)imide, N-butyl-N-methylpyrrolidinium bis(3-trifluoromethylsulfonyl)imide, or 1-butyl-3-methylimidazolium bis(trifluoromethylsulfonyl)imide).

The polymeric ionic liquid (PIL) may include a repeating units including at least one cation and at least one anion. The cation may be at least one of an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, or a triazolium cation, and the anion may be at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2O)_2PO^-$.

The lithium salt may be any lithium salt used in the art. For example, the lithium salt may be, for example, at least one of $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently natural numbers), LiCl, or LiI. A concentration of the lithium salt in the liquid electrolyte may be about 0.1 molar (M) to about 5 M. The amount of the liquid electrolyte soaked in the cathode layer 10 may be 0 to about 100 parts by weight, 0 to about 50 parts by weight, 0 to about 30 parts by weight, 0 to about 20 parts by weight, 0 to about 10 parts by weight, or 0 to about 5 parts by weight, with respect to 100 parts by weight of the cathode active material layer 12 excluding the liquid electrolyte.

According to another aspect, a method of manufacturing an all-solid secondary battery includes: providing a solid electrolyte layer; disposing a first anode active material composition on a first surface of the solid electrolyte layer 30; thermally treating the first anode active material composition to dispose a first anode active material layer 22; disposing a second anode active material layer on a surface of the first anode active material layer; and disposing a cathode active material layer 12 on a second surface of the solid electrolyte layer 30. Due to the sequential arrangement of the first anode active material layer 22 and the second anode active material layer 23 on the solid electrolyte layer 30, a short-circuit of the all-solid secondary battery 1 may be suppressed, and cycle characteristics of the all-solid secondary battery 1 may be improved.

For example, the all-solid secondary battery 1 according to an aspect may be manufactured by separately manufacturing the cathode layer and the solid electrolyte layer 30 on which the first anode active material layer 22 and the second anode active material layer 23 are sequentially disposed, and then stacking these layers upon one another.

(Preparation of Laminate of Solid Electrolyte Layer/Anode Layer)

The materials constituting the first anode active material layer 22, for example, a first carbonaceous anode active material, optionally a metal or metalloid anode active material, and optionally at least one of a binder or an additive, may be added to a polar solvent or a non-polar solvent to prepare a slurry (first anode active material composition). The prepared slurry may be coated on a surface of the solid electrolyte layer 30 and dried to prepare a first laminate in which the first anode active material composition is disposed on a first surface of the solid electrolyte layer 30. The first laminate may be thermally treated to prepare a second laminate in which the first anode active material layer 22, which is a sintered product, is disposed on the solid electrolyte layer 30. The thermal treatment temperature may be, for example, about 300° C. to about 900° C., about 350° C. to about 800° C., about 400° C. to about 700° C., about 400° C. to about 600° C., or about 400° C. to about 500° C. When the thermal treatment temperature is too low, an organic material such as a binder may remain, and the sintering of the solid electrolyte layer 30 and the first anode active material layer 22 may be insufficient. When the thermal treatment temperature is too high, the first carbonaceous anode active material and/or metal or metalloid anode active material may be deteriorated. The thermal treatment time may be about 0.1 hour to about 20 hours, about 0.5 hour to about 15 hours, about 1 hour to about 10 hours, about 1 hour to about 5 hours, or about 1 hour to about 3 hours. However, the thermal treatment temperature and time are not limited to these ranges, and may be adjusted as needed. The thermal treatment atmosphere may be an inert gas atmosphere. The inert gas may be argon or nitrogen, for example.

Subsequently, the materials constituting the second anode active material layer 23, for example, a second carbonaceous anode active material or a metal or metalloid anode active material, and optionally at least one of a binder or an additive, may be added to a polar solvent or a non-polar solvent to prepare a slurry (second anode active material composition). The prepared slurry may be coated on a surface of the first anode active material layer 22 and dried to prepare a third laminate in which the second anode active material layer 23 is disposed on a surface of the first anode active material layer 22, and the first anode active material layer 22 is between the solid electrolyte layer 30 and the second anode active material layer 23. The second anode active material composition may be the same as, or different from, the first anode active material composition.

Subsequently, the anode current collector 21 may be disposed on a surface of the dried third laminate and then pressed to thereby form a laminate of the solid electrolyte layer 30 and the anode layer 20. The pressing may be carried out using, for example, roll pressing or flat pressing. However, aspects are not limited to these methods, and any pressing method used in the art may be used. A pressure applied in the pressing may be, for example, about 50 megapascals (MPa) to about 500 MPa, or about 100 MPa to about 450 MPa, or about 100 MPa to about 350 MPa. The pressing time for which a pressure is applied may be about 5 milliseconds (ms) to about 10 minutes (min). The pressing may be carried out, for example, at a temperature from room temperature (20° C.) to about 90° C., or at a temperature from about 25° C. to about 90° C. In another aspect, the pressing may be carried out at a temperature of about 100° C. or greater, for example, about 100° C. to about 300° C., or about 100° C. to about 250° C.

Before the second anode active material layer 23 is disposed on the first anode active material layer 22, the surface of the first anode active material layer 22 may be washed with an acidic solution. Washing of the surface of the first anode active material layer 22 with an acidic solution, removes impurities from the surface of the first anode active material layer 22, thereby reducing the interfacial resistance between the first anode active material layer 22 and the second anode active material layer 23. The acidic solution may include an acid, for example, at least one of hydrochloric acid, nitric acid, or sulfuric acid, but the acid and acidic solution are not necessarily limited thereto, and any acid/acidic solution for use for removing surface impurities may be used. The acidic solution may have, for example, a pH of 0.1 to 6, a pH of 0.5 to 5, a pH of 1 to 4, a pH of 1 to 3, or a pH of 1 to 2.

(Preparation of Cathode Layer)

The materials of the cathode active material layer 12 (for example, the cathode active material, a binder), may be added to a non-polar solvent to prepare a slurry (cathode active material layer composition). The prepared slurry may be coated on the cathode current collector 11 and then dried to form a laminate. The obtained laminate may be pressed to thereby form the cathode layer 10. The pressing may be performed using any suitable pressing method, and is not limited to a specific method. For example, the pressing can include roll pressing, flat pressing, or isotactic pressing. The pressing may be omitted. In other aspects, the cathode layer 10 may be formed by compaction-molding the cathode active material layer composition into pellets or extending the mixture into a sheet form. When these methods are used to form the cathode layer 10, the cathode current collector 11 may be omitted. In another aspect, the cathode layer 10 may be impregnated with a liquid electrolyte before use.

(Preparation of Solid Electrolyte Layer)

For example, the solid electrolyte layer 30 including an oxide-containing solid electrolyte may be prepared by thermally treating precursors of an oxide-containing solid electrolyte material.

The oxide-containing solid electrolyte may be prepared by contacting the precursors in stoichiometric amounts to form a mixture and thermally treating the mixture. For example, the contacting may include milling, such as ball milling, or grinding. The mixture of the precursors combined in stoichiometric amounts may be subjected to a first thermal treatment under an oxidizing atmosphere to prepare a first thermal treatment product. The first thermal treatment may be carried out at a temperature of less than 1,000° C. for about 1 hour to about 36 hours. For example, the first thermal treatment may be performed at a temperature of about 100° C. to about 900° C., or about 200° C. to about 750° C. The first thermal treatment product may then be ground. The first thermal treatment product may be ground in a wet grinding or dry grinding manner. For example, the wet grinding may be carried out by mixing the first thermal treatment product with a solvent such as methanol and milling the mixture using, for example, a ball mill for about 0.5 hour to about 10 hours. Dry grinding may be performed using, for example, a ball mill without solvent. The ground first thermal treatment product may have a particle diameter of about 0.1 μm to about 10 μm, or about 0.1 μm to about 5 μm. The ground first thermal treatment product may be dried. The ground first thermal treatment product may be shaped in pellet form following mixing with a binder solution, or may be shaped in pellet form by simply being pressed at a pressure of about 0.09 to about 1 MPa, or about 0.1 MPa to about 1 MPa.

The shaped product in pellet form may be subjected to a second thermal treatment at a temperature of less than or equal to about 1,000° C. for about 1 hour to about 36 hours. Through the second thermal treatment, the solid electrolyte layer 30, which is a sintered product, may be obtained. The second thermal treatment may be carried out, for example, at a temperature of about 550 to 1,000° C., or about 600° C. to about 900° C., or about 700° C. to about 850° C. For example, the second thermal treatment time may be about 1 to about 36 hours. The second thermal treatment temperature for obtaining the sintered product may be greater than the first thermal treatment temperature. For example, the second thermal treatment temperature may be about 10° C. or greater, about 20° C. or greater, about 30° C. or greater, or about 50° C. or greater than the first thermal treatment temperature. The second thermal treatment of the shaped product may be carried out under at least one of an oxidizing atmosphere or a reducing atmosphere. The second thermal treatment may be carried out under a) an oxidizing atmosphere, b) a reducing atmosphere, or c) an oxidizing and reducing atmosphere.

For example, the solid electrolyte layer 30 including a sulfide-containing solid electrolyte may be prepared using a solid electrolyte including a sulfide-containing solid electrolyte material.

The sulfide-containing solid electrolyte may be prepared by treatment of a precursor (source) material with, for example, melt quenching or mechanical milling. However, aspects are not limited thereto. Any suitable method of preparing a sulfide-containing solid electrolyte may be used. For example, in the case of melt quenching, predetermined amounts of the source material, such as $Li_2S$ and $P_2S_5$, are mixed together, made into pellets, reacted at a predetermined reaction temperature under vacuum conditions, and then quenched to thereby prepare a sulfide-containing solid electrolyte. The reaction temperature of the mixture of $Li_2S$ and $P_2S_5$ may be, for example, about 400° C. to about 1000° C., or about 800° C. to about 900° C. The reaction time may be, for example, about 0.1 hour to about 12 hours, or about 1 hour to about 12 hours. The quenching temperature of the reaction product may be about 10° C. or less or about 0° C. or less, and the quenching rate may be about 1° C. per second (° C./sec) to about 10,000° C./sec, or about 1° C./sec to about 1,000° C./sec. For example, in the case of using mechanical milling, the source materials such as $Li_2S$ and $P_2S_5$ may be reacted while stirring using, for example, a ball mill, to thereby prepare a sulfide-containing solid electrolyte. The stirring rate and stirring time in the mechanical milling are not specifically limited. The higher the stirring rate, the greater the production rate of the sulfide-containing solid electrolyte. The longer the stirring time, the greater the rate of conversion of the source material into the sulfide containing solid electrolyte. Then, the mixture of the source materials, obtained by melting quenching or mechanical milling, may be thermally treated at a predetermined temperature and then ground to thereby prepare a solid electrolyte in the form of particles. When the solid electrolyte has glass transition characteristics, the solid electrolyte may be converted from an amorphous form to a crystalline form by thermal treatment.

The solid electrolyte obtained through a method as described above may be deposited using a film formation method, for example, an aerosol deposition method, a cold spraying method, or a sputtering method, to thereby prepare the solid electrolyte layer 30. In one or more aspects, the solid electrolyte layer 30 may be prepared by pressing the solid electrolyte particles. In another aspect, the solid electrolyte layer 30 may be formed by mixing a solid electrolyte, a solvent, and a binder together to obtain a mixture, and coating the mixture on a surface, drying, and then pressing the mixture.

(Manufacture of all-Solid Secondary Battery)

The cathode layer 10, and the laminate of the anode layer 20 and the solid electrolyte layer 30, which are formed according to the above-described methods, may be stacked such that the solid electrolyte layer 30 is interposed between the cathode layer 10 and the anode layer 20. The stacked layers are then pressed to manufacture the all-solid secondary battery 1.

For example, the first laminate of the anode layer 20 and the solid electrolyte layer 30 may be disposed on the cathode layer 10 such that the solid electrolyte layer contacts the cathode layer 10, to thereby prepare a second laminate. The second laminate may then be pressed to thereby manufacture the all-solid secondary battery 1. For example, the pressing may be performed using, for example, roll pressing, flat pressing, or isotactic pressing. However, aspects are not limited thereto, and any suitable pressing method may be used. A pressure applied in the pressing may be, for about 50 MPa to about 750 MPa, or about 100 MPa to about 700 MPa, or about 100 MPa to about 500 MPa. The pressing time for which a pressure is applied may be about 5 ms to about 5 min. The pressing may be carried out, for example, at a temperature from room temperature (20° C. to about 90° C., or at a temperature from to about 90° C. In another aspect, the pressing may be carried out at a temperature of 100° C. or greater, for example about 100° C. to about 900° C., or about 100° C. to about 500° C. Although the structures of the all-solid secondary battery 1 and the methods of manufacturing the all-solid secondary battery 1 are described above as aspects, the disclosure is not limited thereto, and the constituent members of the all-solid secondary battery and the manufacturing processes may be appropriately varied. The pressing may be omitted.

One or more aspects of the present disclosure will now be described in detail with reference to the following examples. However, these examples are only for illustrative purposes and are not intended to limit the scope of the one or more aspects of the present disclosure.

EXAMPLES

Example 1: First Layer (Ag+CB, 5 μm)/Second Layer (Ag+CB, 25 μm), and 450° C.-Thermal Treatment of First Layer (Preparation of Laminate of Solid Electrolyte Layer/Anode Layer Carbon black (CB) having a primary particle diameter of about 38 nm and silver (Ag) particles having an average particle diameter of about 100 nm were prepared as anode active materials.

3 grams (g) of the carbon black (CB) and 1 g of the silver particles were put into a container. 2.692 g of a polyvinyl alcohol-polyacrylic acid (PVA-PAA) binder solution (SUMITOMO SEIKA CHEMICALS CO., LTD; AG binder) was mixed with 7 g of distilled water, and then added into the container, and the contents were stirred at about 1,000 rpm for about 30 minutes to prepare a first slurry. 4 g of zirconia balls and 20 g of distilled water were added to the first slurry and stirred at about 1,000 rotations per minute (rpm) for about 30 minutes (secondary stirring) to prepare a second slurry. 20 g of distilled water was added to the second slurry and stirred at 1,000 rpm for 30 minutes to prepare a third slurry.

$Li_7La_3Zr_2O_{12}$ (LLZO) pellets having a thickness of about 495 μm were prepared as a solid electrolyte layer.

The third slurry was spin-coated onto a surface of the LLZO pellets, dried at room temperature for 1 hour, and then vacuum-dried for 12 hours to obtain a laminate of the solid electrolyte layer and a precursor layer. The obtained laminate was thermally treated at 450° C. for 2 hours to obtain a first anode active material layer, which was a sintered product. The surface of the first anode active material layer was washed with a hydrochloric acid solution to remove impurities from the surface of the first anode active material layer. The first anode active material layer had a thickness of about 5 μm.

The previously-prepared third slurry was spin-coated again on the first anode active material layer, dried at room temperature for 1 hour, and then vacuum-dried at 150° C. for 12 hours to obtain a second anode active material layer. The second anode active material layer had a thickness of about 25 μm. The second anode active material layer was prepared using the same composition and the same method as those applied to the precursor layer of the first anode active material layer, except for the thermal treatment.

An anode current collector consisting of a copper (Cu) foil having a thickness of 10 μm was disposed on the second anode active material layer and then pressed using cold isotactic pressing (CIP) at a pressure of 250 MPa and a temperature of about 25° C. to attach the anode current collector, thereby preparing a laminate of solid electrolyte layer/anode layer.

(Preparation of Cathode Layer)

$LiNi_{0.8}Co_{0.15}Mn_{0.05}O_2$ (NCM) was prepared as a cathode active material. In addition, a polytetrafluoroethylene (PTFE) binder (Teflon™ binder, available from DuPont) was prepared. Carbon nanotube fibers (CNF) were prepared as a conducting agent. Then, the cathode active material, the conducting agent, and the binder were mixed in a mass ratio of 100:2:1. The mixture was stretched in the form of a sheet to prepare a cathode active material sheet. This cathode active material sheet was pressed onto a cathode current collector consisting of an aluminum foil having a thickness of 18 μm to form a cathode layer. A thickness of the cathode anode active material layer in the cathode layer was about 100 μm.

The cathode anode active material layer of the formed cathode layer was soaked with a liquid electrolyte including 2.0M lithium bis(fluorosulfonyl)imide (LiFSI) dissolved in the ionic liquid Pyr13FSI (N-propyl-N-methyl-pyrrolidinium bis(fluorosulfonyl)imide).

(Manufacture of all-Solid Secondary Battery)

The cathode layer was disposed such that the cathode active material layer soaked with the ionic liquid electrolyte solution faced toward an upper end in an SUS cap. The laminate of the solid electrolyte layer/anode layer was disposed such that the solid electrolyte layer was placed on the surface of the cathode active material layer, and then sealed to manufacture an all-solid secondary battery. The cathode layer and the anode layer were insulated using an insulator. Part of each of the cathode current collector and the anode current collector protruded out of the sealed battery and used as a cathode terminal and an anode terminal, respectively.

Example 2: First Layer (Ag+CB, 5 μm)/Second Layer (Ag+CB, 25 μm), 600° C.-Thermal Treatment of First Layer An all-solid secondary battery was manufactured in the same manner as in Example 1, except that the thermal treatment temperature was changed to 600° C. in the preparation of the first anode active material layer.

Example 3: First Layer (CB, 5 um)/Second Layer (Ag+CB, 25 μm)

An all-solid secondary battery was manufactured in the same manner as in Example 1, except that 4 g of carbon black was used, instead of 3 g of carbon black (CB) and 1 g of the silver particles, in the preparation of the first anode active material layer.

Example 4: First Layer (CB, 5 um)/Second Layer (CB, 25 μm)

An all-solid secondary battery was manufactured in the same manner as in Example 1, except that 4 g of carbon black was used, instead of 3 g of carbon black (CB) and 1 g of the silver particles, in the preparation of each of the first anode active material layer and the second anode active material layer.

Example 5: First Layer (Ag+CB, 5 μm)/Second Layer (Ag+CB, 25 μm), and 300° C.-Thermal Treatment of First Layer An all-solid secondary battery was manufactured in the same manner as in Example 1, except that, in preparation of the first anode active material layer, the thermal treatment temperature was varied to 300° C.

Example 6: First Layer (Ag 1 g+CB 3 g, 5 μm)/Second Layer (Ag 1.5 g+CB 2.5 g, 25 μm), and 450° C.-Thermal Treatment of First Layer An all-solid secondary battery was manufactured in the same manner as in Example 1, except that, in preparation of the second anode active material layer, amounts of carbon black (CB) and silver particles in the first slurry were respectively varied to 2.5 grams (g) of the carbon black (CB) and 1.5 g of the silver particles.

Comparative Example 1: First Layer (Ag+CB, 3 μm) Alone

An all-solid secondary battery was manufactured in the same manner as in Example 1, except that the step of forming the second anode active material layer was omitted, a thickness of the first layer was varied to 3 μm, and a laminate of the solid electrolyte/anode layer including only the first anode active material layer alone was prepared.

Comparative Example 2: Second Layer (Ag+CB, 27 μm) Alone

An all-solid secondary battery was manufactured in the same manner as in Example 1, except that the step of forming the first anode active material layer was omitted, a thickness of the second layer was varied to 27 μm, and a laminate of the solid electrolyte/anode layer including only the second anode active material layer was prepared.

Comparative Example 3: First Layer (Ag+CB, 5 μm)/Second Layer (Ag+CB, 25 μm)/No Thermal Treatment of First Layer An all-solid secondary battery was manufactured in the same manner as in Example 1, except that, in preparation of the first anode active material layer, only vacuum drying was performed at 150° C. for 12 hours, instead of the additional thermal treatment at 450° C.

Evaluation Example 1: Surface Morphology and Composition Evaluation

Figure 5A:
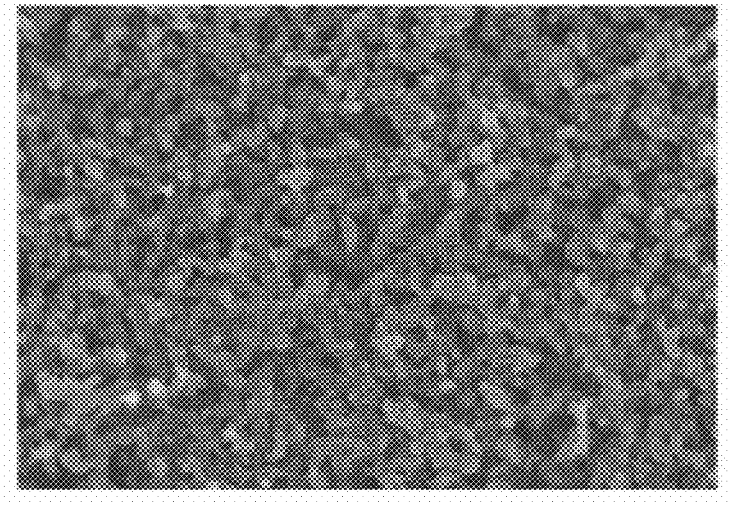
FIG. 5A is a scanning electron microscope (SEM) image of a surface of a precursor layer, which is a product formed after spin coating and drying and before thermal treatment at 450° C., as described in Example 1.
Figure 5B:
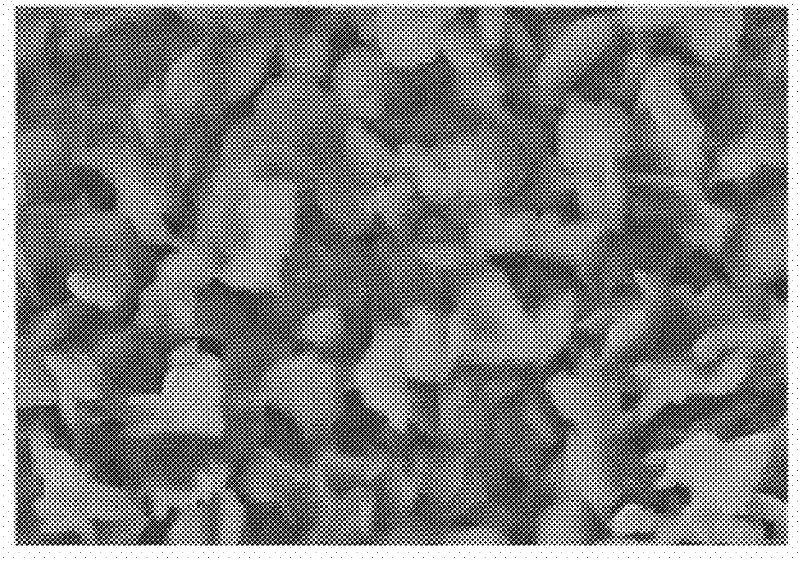
FIG. 5B is a SEM image of a surface of a first anode active material layer after the thermal treatment at 450° C. described in Example 1.

The scanning electron microscope (SEM) images of the surface of the precursor layer which was a product of drying performed before the thermal treatment at 450° C. in Example 1 and the surface of the first anode active material layer which was a product of sintering performed by the thermal treatment at 450° C. in Example 1 are shown in FIGS. 5A and 5B, respectively.

As shown in FIGS. 5A and 5B, the carbon black particles included in the first anode active material layer had a greater average particle diameter as compared with the average particle diameter of the carbon black particles included in the precursor layer.

Although not shown, the silver (Ag) particles included in the first anode active material layer had a greater average particle diameter as compared with the average particle diameter of the silver (Ag) particles included in the precursor layer.

The carbon black (CB) included in the precursor layer had an average particle diameter of about 38 nm, and the carbon black (CB) included in the first anode active material layer had an average particle diameter of about 450 nm.

The silver (Ag) particles included in the precursor layer had an average particle diameter of about 100 nm, and the silver (Ag) particles included in the first anode active material layer had an average particle diameter of about 500 nm.

The average particle diameters of the carbon black (CB) and silver (Ag) particles included in the first anode active material layer were determined by analyzing the SEM images thereof.

The first anode active material layer had a reduced thickness and increased density since the decomposition and removal of the binder through sintering, and the carbon black (CB) particles and the silver (Ag) particles had an increased particle size due to the sintering.

Figure 6A:
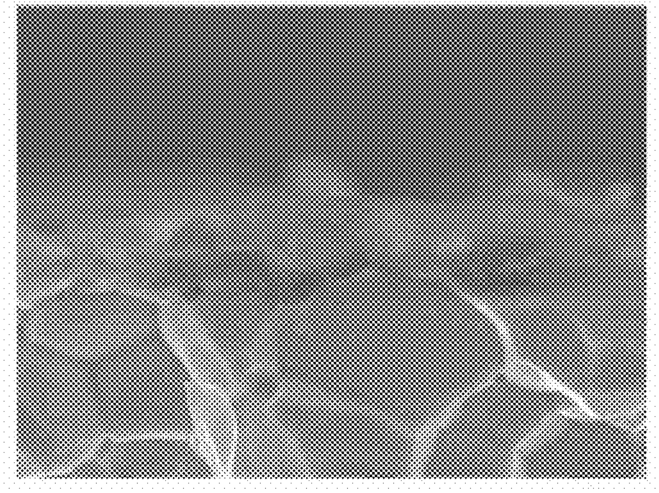
FIG. 6A is a SEM image of a cross-section of the laminate of solid electrolyte layer/first anode active material layer prepared in Example 1.

FIG. 6A is a SEM image of a cross-section of the laminate of the solid electrolyte layer/first anode active material layer prepared in Example 1.

As shown in FIG. 6A, the first anode active material layer was found to be disposed on the surface of the solid electrolyte layer.

Figure 6B:
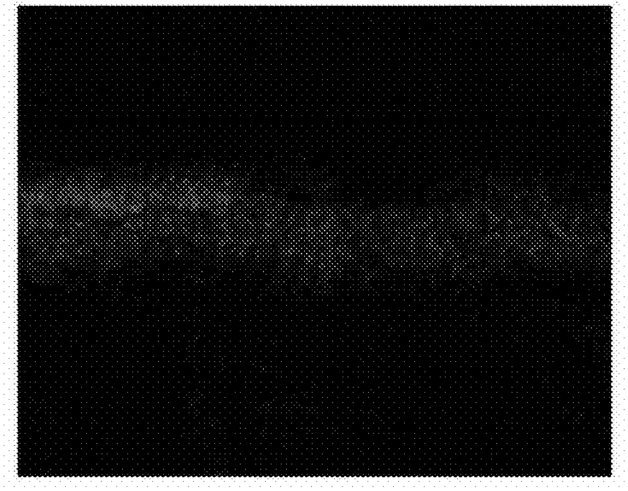
FIG. 6B is an energy-dispersive X-ray spectroscopy (EDX) carbon mapping image of the cross-section of the laminate of solid electrolyte layer/first anode active material layer prepared in Example 1.

FIG. 6B is an energy-dispersive X-ray spectroscopy (EDX) carbon element mapping image of the cross-section of the laminate of the solid electrolyte layer/first anode active material layer prepared in Example 1.

As shown in FIG. 6B, the first anode active material layer disposed on the surface of the solid electrolyte layer was found to include carbon.

Figure 7A:
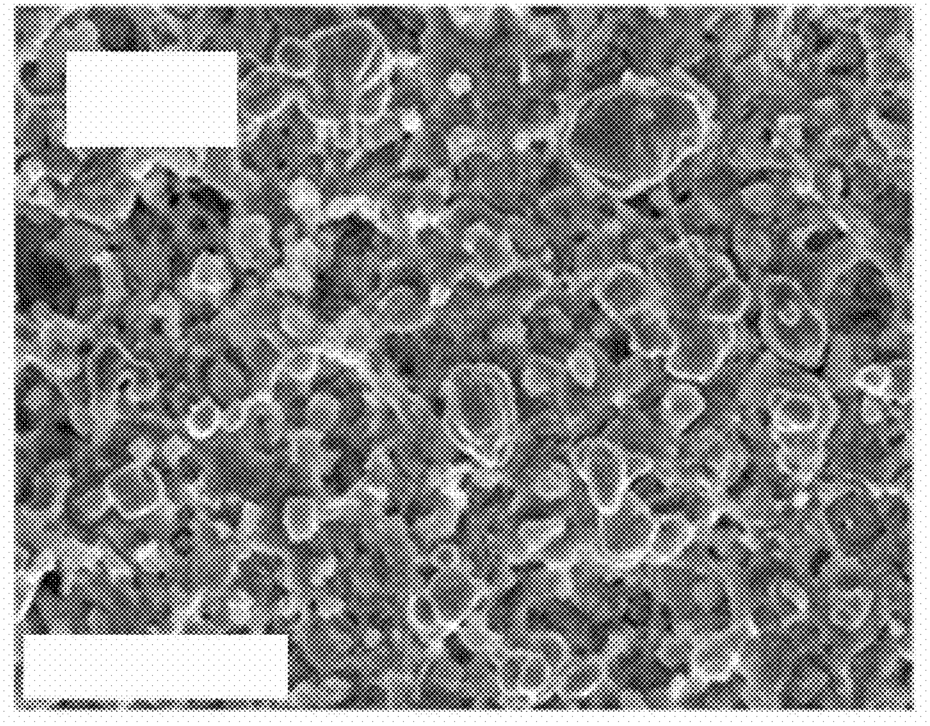
FIG. 7A is a SEM image of a surface of a first anode active material layer prepared in Example 2.

A SEM image of the surface of the first anode active material layer obtained in Example 2, which was a sintered product obtained through thermal treatment at 600° C., is shown in FIG. 7A.

Figure 7B:
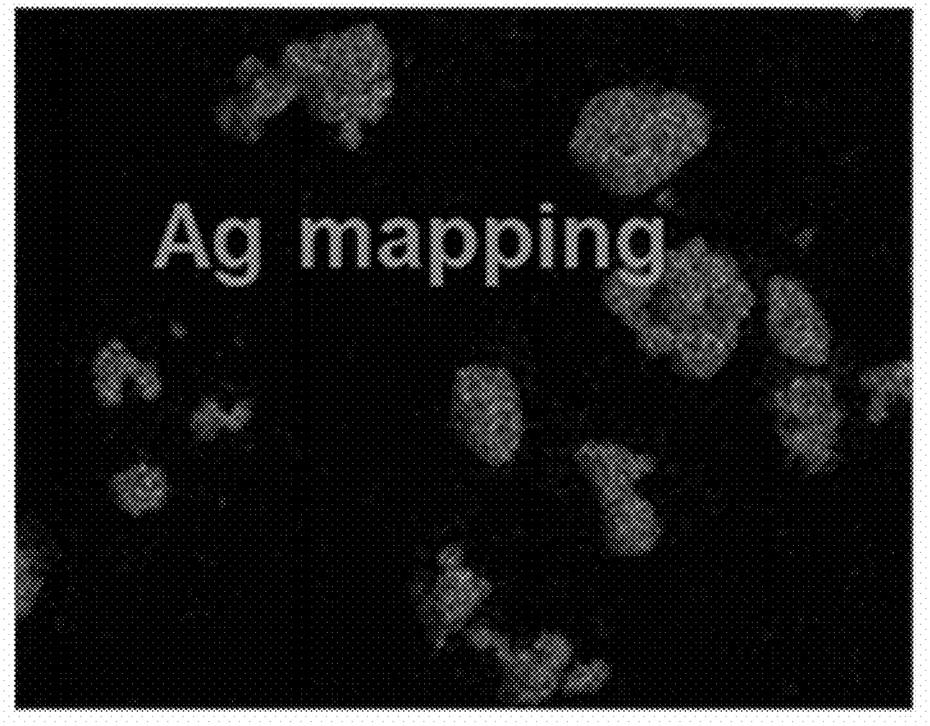
FIG. 7B is an EDX silver (Ag) mapping image of the surface of the first anode active material layer prepared in Example 2.
Figure 7C:
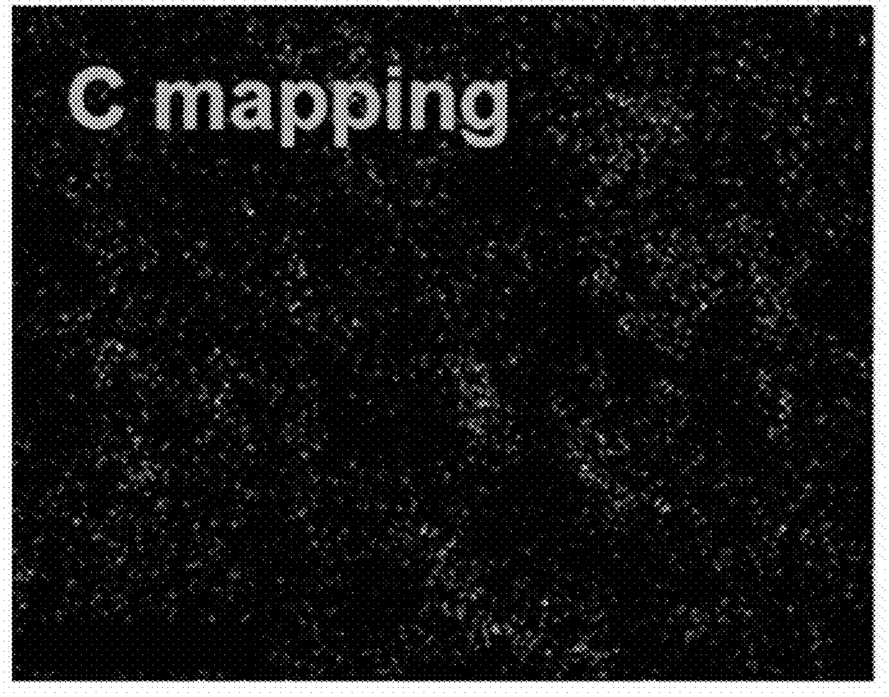
FIG. 7C is an EDX carbon mapping image of the surface of the first anode active material layer prepared in Example 2.

FIGS. 7B and 7C are EDX silver (Ag) element mapping and carbon element mapping images, respectively, of the surface of the first anode active material layer prepared in Example 2.

As shown in FIGS. 7B and 7C, the first anode active material layer disposed on the surface of the solid electrolyte layer was found to include silver particles and carbon particles.

It was also found that because impurities such as $Li_2CO_3$ remaining after the thermal treatment at 600° C. were removed through the treatment of the surface of the first anode active material layer with acid, the carbon was still exposed and present on the surface of the first anode active material layer after the acid treatment.

Figure 8A:
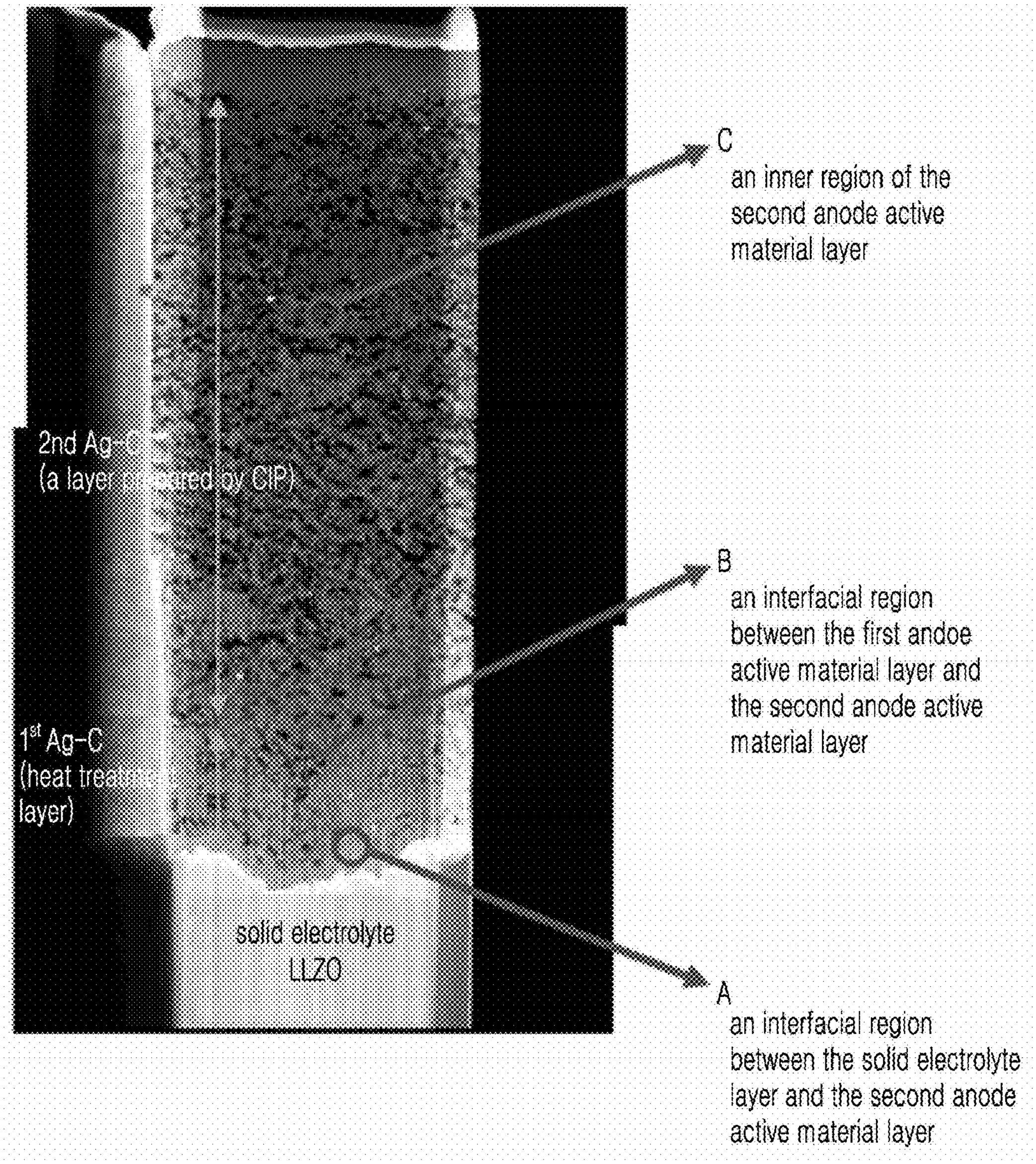
FIG. 8A is a SEM image of a cross-section of the laminate of solid electrolyte layer/anode layer prepared in Example 2.

FIG. 8A is a SEM image of a cross-section of the laminate of solid electrolyte layer/anode layer prepared in Example 2.

Figure 8B:
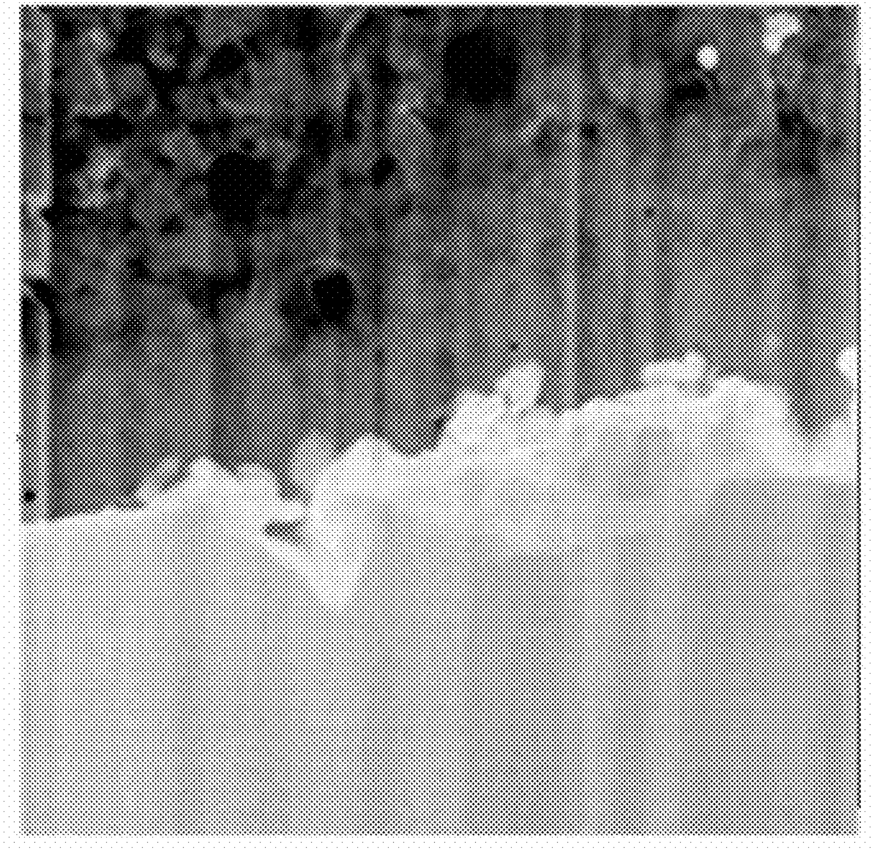
FIG. 8B is a partial enlarged view of the interfacial region (A) between the solid electrolyte layer and the first anode active material layer in FIG. 8A.

FIG. 8B is a partial enlarged view of an interfacial region (A) between the solid electrolyte layer and the first anode active material layer in FIG. 8A.

Figure 8C:
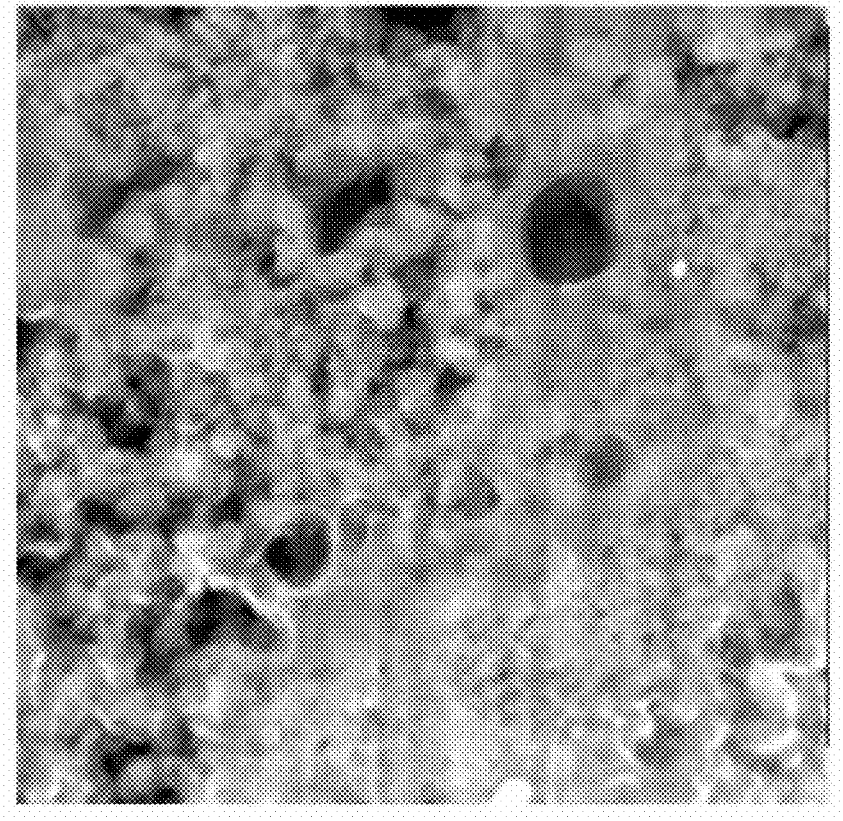
FIG. 8C is a partial enlarged view of the interfacial region (B) between the first anode active material layer and the second anode active material layer in FIG. 8A.

FIG. 8C is a partial enlarged view of an interfacial region (B) between the first anode active material layer (thermally treated layer) and a second anode active material layer (dried layer or a layer prepared by CIP).

Figure 8D:
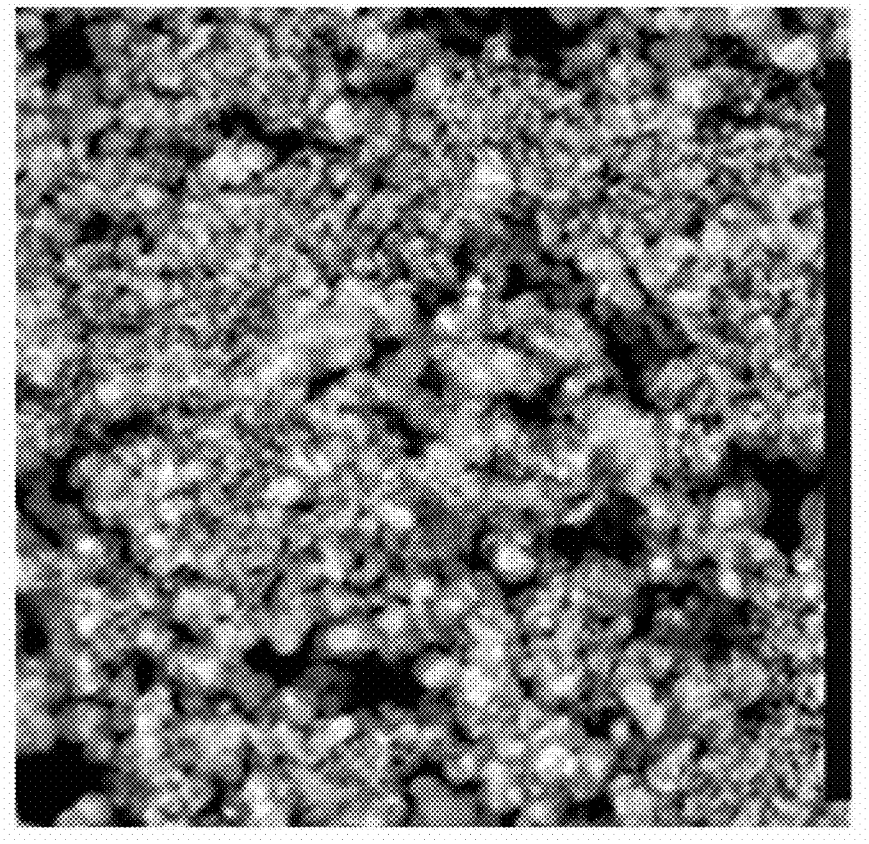
FIG. 8D is a partial enlarged view of an inner region (C) of the second anode active material layer in FIG. 8A.

FIG. 8D is a partial enlarged view of an inner region (C) of the second anode active material layer (dried layer or a layer prepared by CIP) in FIG. 8A.

Figure 8E:
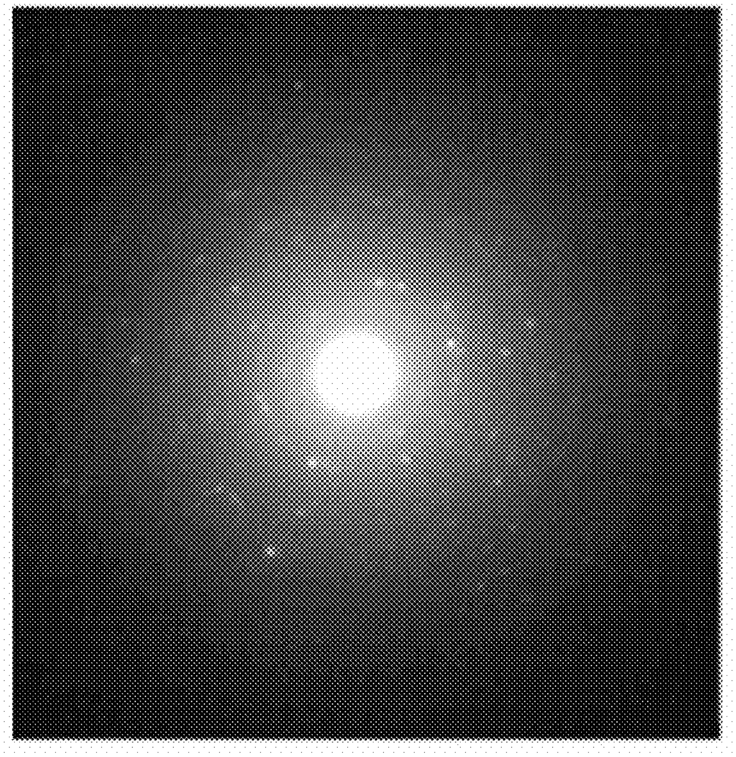
FIG. 8E is an X-ray diffraction (XRD) pattern of the first anode active material layer (thermally treated layer) adjacent to the solid electrolyte layer in FIG. 8A.

FIG. 8E is an X-ray diffraction (XRD) pattern of the first anode active material layer (thermally treated layer) adjacent to the solid electrolyte layer in FIG. 8A.

Figure 8F:
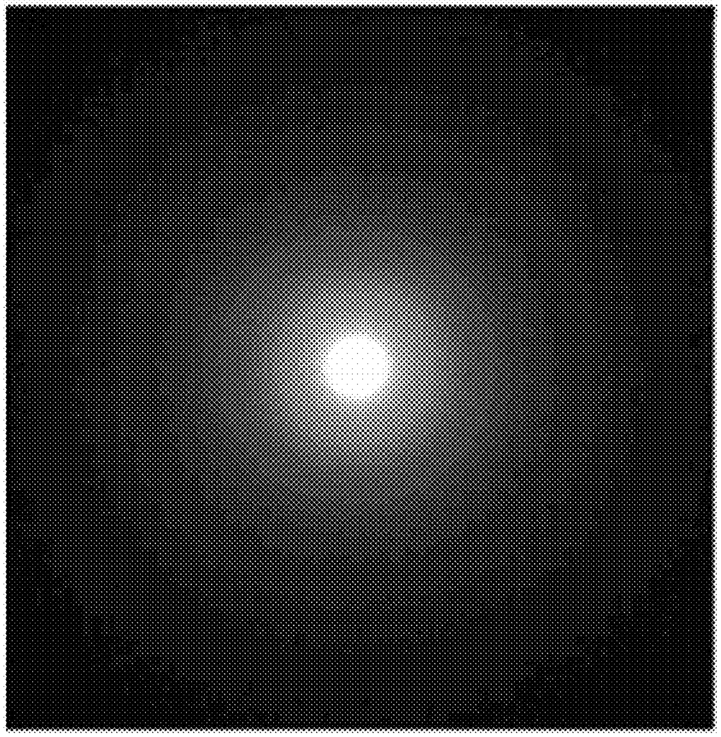
FIG. 8F is an XRD pattern of the second anode active material layer adjacent to the first anode active material layer in FIG. 8A.

FIG. 8F is an XRD pattern of the second anode active material layer (dried layer or a layer prepared by CIP) adjacent to the first anode active material layer (thermally treated layer) in FIG. 8A.

Figure 8G:
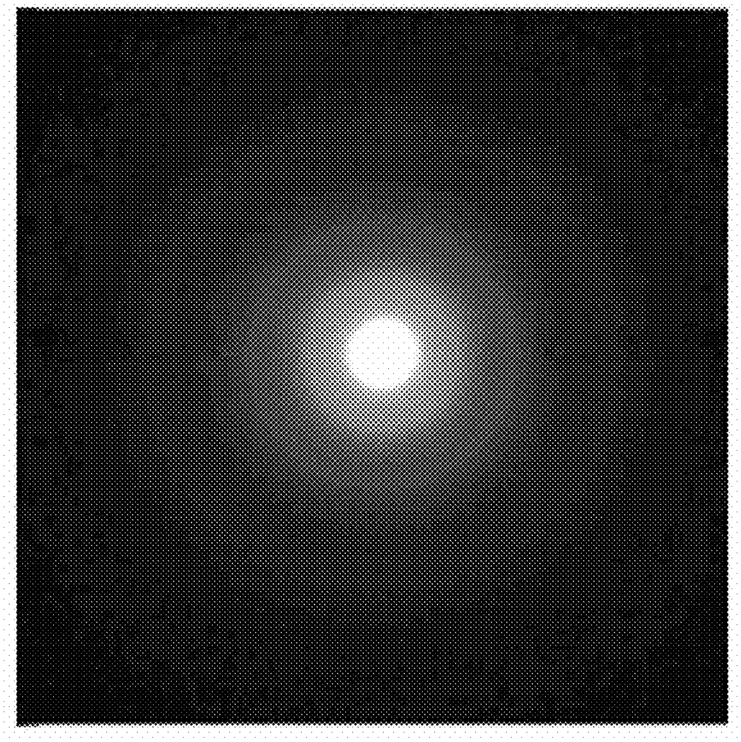
FIG. 8G is an XRD pattern of an inner region of the second anode active material layer in FIG. 8A.

FIG. 8G is an XRD pattern of an inner region of the second anode active material layer (dried layer or a layer prepared by CIP) in FIG. 8A.

Referring to FIG. 8E, it is found that a diffraction pattern of crystallized carbon appeared partially in the first anode active material layer, whereas such a diffraction pattern did not appear in the second anode active material layer as shown in FIGS. 8F and 8G.

Therefore, the carbon included in the first anode active material layer had greater degree of crystallinity than the carbon included in the second anode active material layer. It is also found that the first anode active material layer had a greater density than that of the second anode active material layer.

Figure 8H:
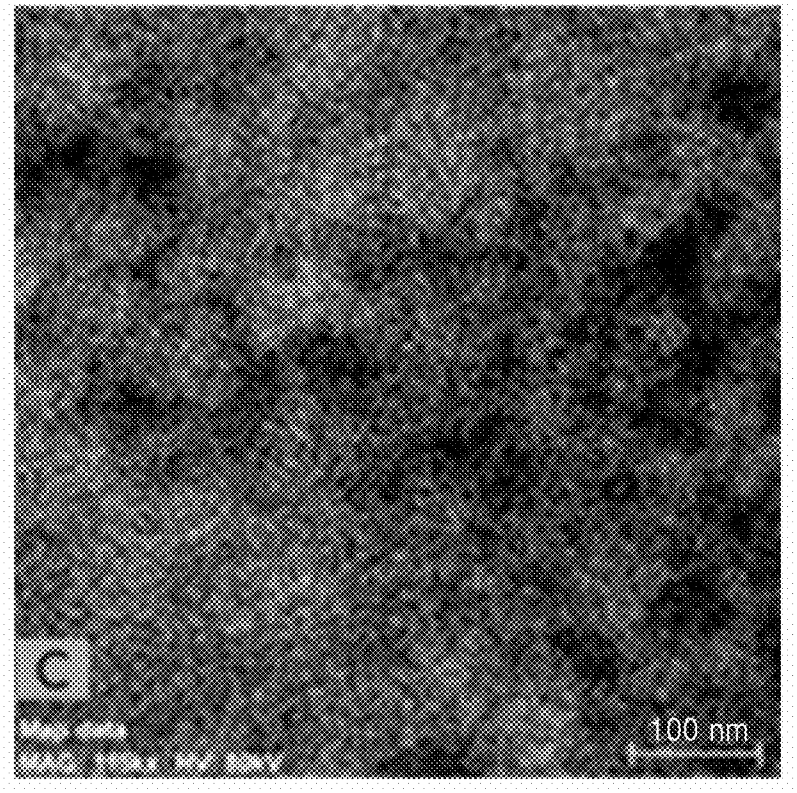
FIG. 8H is an EDX carbon mapping image of a cross-section of the first anode active material layer adjacent to the solid electrolyte layer in FIG. 8A.

FIG. 8H is an EDX carbon element mapping image of a cross-section of the first anode active material layer (thermally treated layer) adjacent to the solid electrolyte layer in FIG. 8A.

Figure 8I:
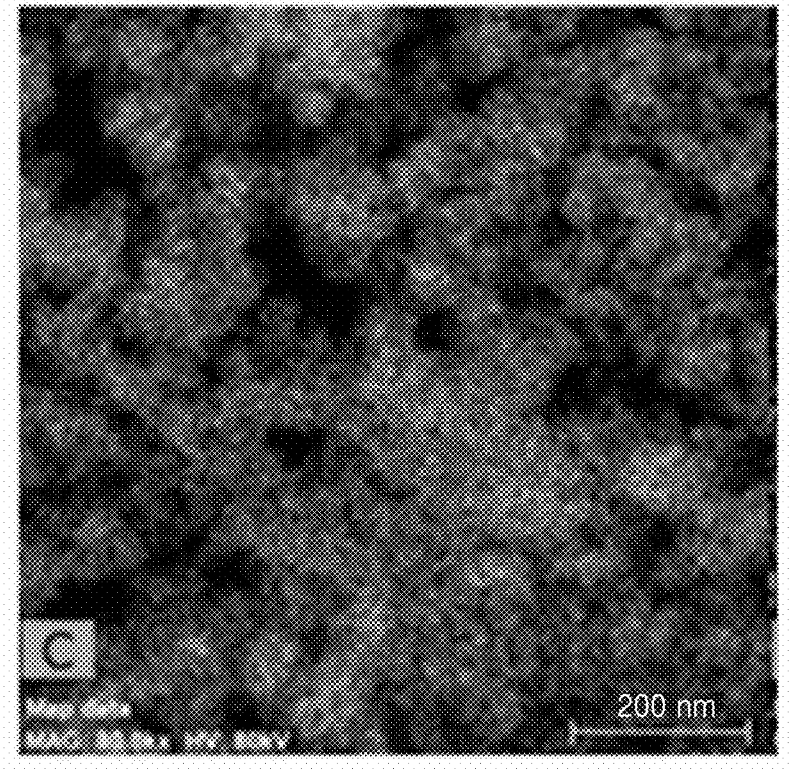
FIG. 8I is an EDX carbon mapping image of a cross-section of the second anode active material layer adjacent to the first anode active material layer in FIG. 8A.

FIG. 8I is an f EDX carbon element mapping image of a cross-section of the second anode active material layer (dried layer or a layer prepared by CIP) adjacent to the first anode active material layer (thermally treated layer) in FIG. 8A.

Figure 8J:
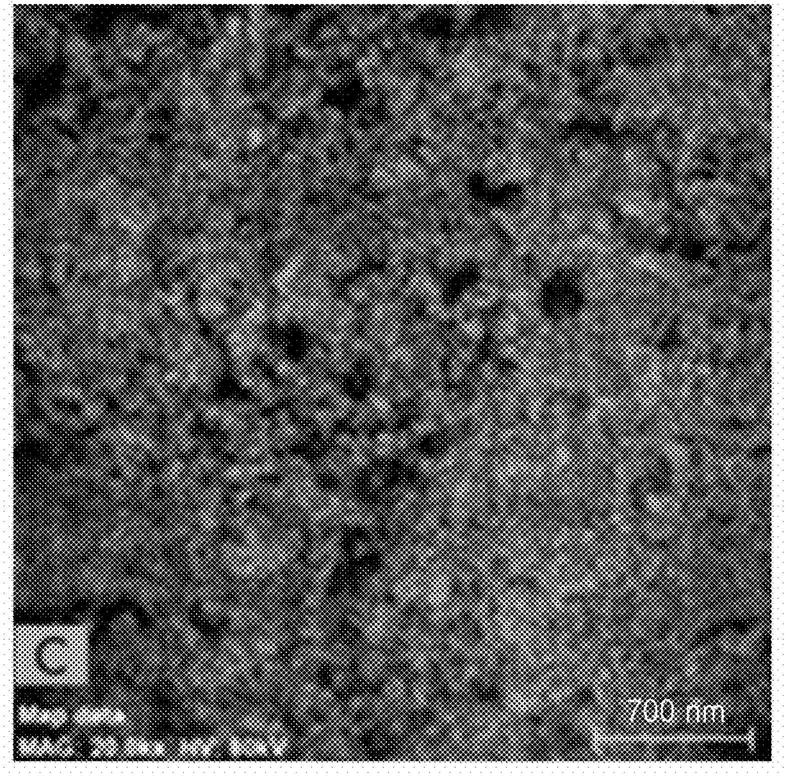
FIG. 8J is an EDX carbon mapping image of a cross-section of a certain region in the second anode active material layer in FIG. 8A.

FIG. 8J is an EDX carbon element mapping image of a cross-section of a certain region in the second anode active material layer (dried layer or a layer prepared by CIP) in FIG. 8A.

As shown in FIGS. 8H to 8J, it is found that carbon was distributed in both of the first anode active material layer and the second anode active material layer.

Evaluation Example 2: Raman Spectrum Evaluation

Figure 9A:
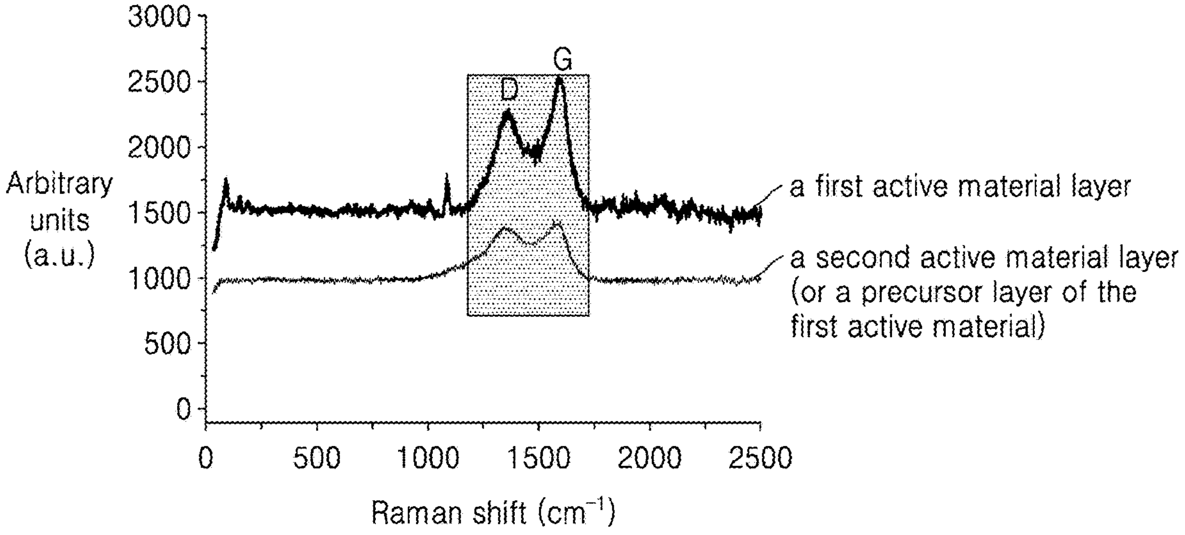
FIG. 9A is graph of arbitrary units (a.u.) versus Raman shift (per centimeter, $cm^{-1}$), showing a Raman spectrum of a surface of a precursor layer (i.e., a second anode active material layer) of Example 1, which was a product of spin coating and drying before thermal treatment at 450° C., and a surface of the first anode active material layer of Example 1 which was a sintered product obtained through the thermal treatment at 450° C.
Figure 9B:
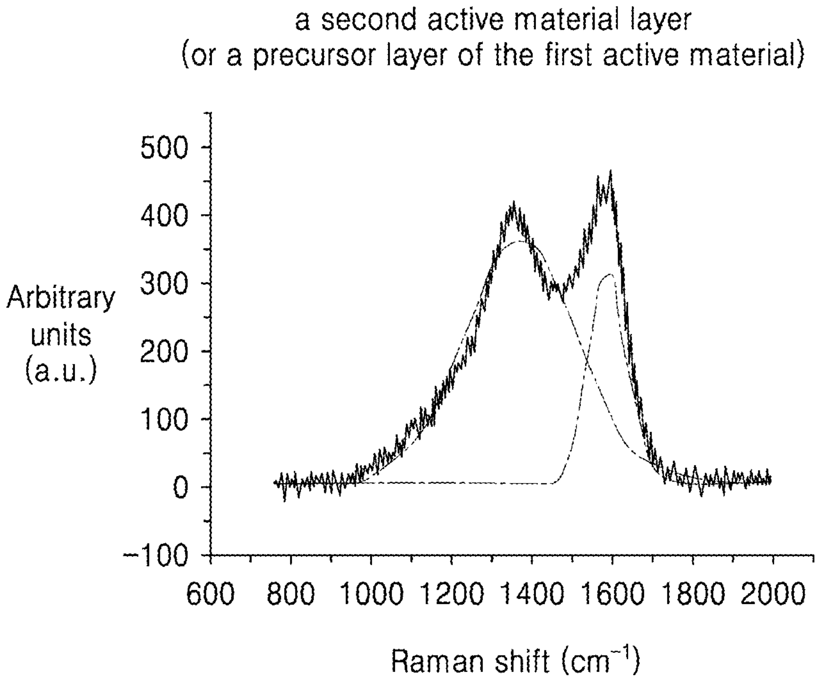
FIG. 9B is a graph of arbitrary units (a.u.) versus Raman shift ($cm^{-1}$), showing the Raman spectrum of a surface of the second active material layer (precursor layer) of Example 1.

The Raman spectrum images of the surface of the precursor layer of Example 1, which was a product of drying before the thermal treatment at 450° C., and the surface of the first anode active material layer which was a sintered product obtained through the thermal treatment at 450° C., are shown in FIGS. 9A and 9B, respectively. Data of the Raman spectra are represented in Table 1. The precursor layer was prepared using the same method and with the same slurry as that for the second anode active material layer. Although not shown in the drawings, the Raman spectrum of the second anode active material layer was the same as the Raman spectrum of the precursor layer.

Figure 9C:
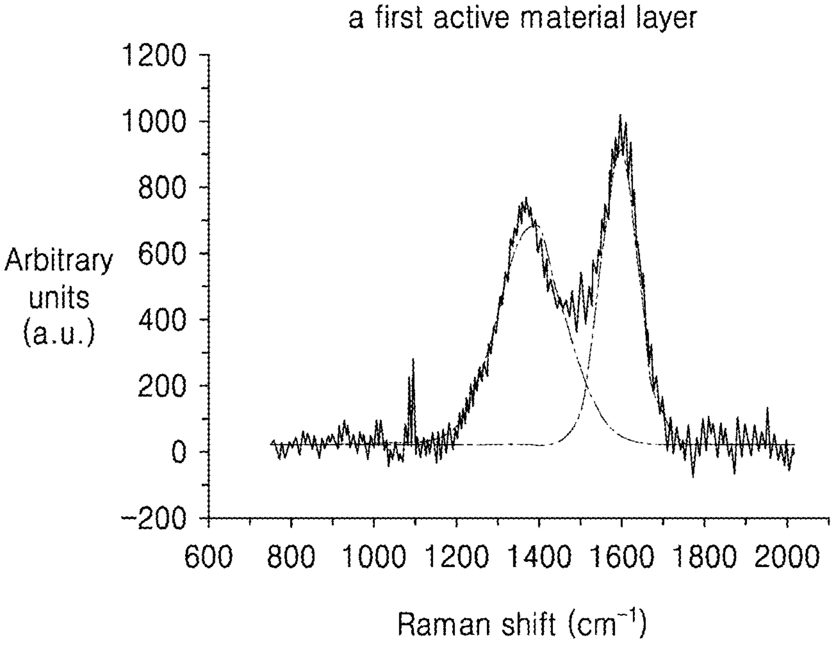
FIG. 9C is a graph of arbitrary units (a.u.) versus Raman shift ($cm^{-1}$), showing the Raman spectrum of a surface of the first anode active material layer of Example 1 after thermal treatment at 450° C.

Overlapping Raman peaks in FIG. 9A were resolved, and an enlarged view of the intensity of each Raman peak is shown in FIGS. 9B and 9C. In FIGS. 9A, 9B, and 9C, the intensity ($I_D$) of D band peak and the intensity ($I_G$) of G band peak are the height of each peak from the base line to the highest peak point.

As shown in FIGS. 9A, 9B, and 9C, in the Raman spectrum of the first anode active material layer, an intensity ratio ($I^1_D/I^1_G$) of a D band peak to a G band peak was 0.74. Therefore, the intensity ratio ($I^1_D/I^1_G$) of a D band peak to a G band peak of the carbon black (CB) included in the first anode active material layer was 0.74. As shown in FIGS. 9A, 9B, and 9C, an intensity ratio ($I^2_D/I^2_G$) of a D band peak to a G band peak in the Raman spectrum of the precursor layer, i.e., the second anode active material layer, was 1.13. Therefore, the intensity ratio ($I^2_D/I^2_G$) of a D band peak to a G band peak of the carbon black (CB) included in the second anode active material layer was 1.13. It was confirmed that the carbon black (CB) included in the second anode active material layer had an increased intensity ratio ($I_D/I_G$) of a D band peak to a G band peak in the Raman spectrum thereof, as compared with that of the carbon black (CB) included in the first anode active material layer.

Therefore, it was confirmed that the carbon black (CB) included in the first anode active material layer had reduced defects and improved crystallinity, as compared with the carbon black (CB) included in the second anode active material layer.

TABLE 1

| | | Peak Area | Peak Center | Peak Width | Peak Height |
|---|---|---|---|---|---|
| Second active material layer | D band peak | 127,540 | 1,372.0 | 283.25 | 359.26 |
| | G band peak | 36,689 | 1,586.4 | 92.000 | 318.19 |
| First active material layer | D band peak | 135,610 | 1,375.9 | 163.00 | 663.82 |
| | G band peak | 106,800 | 1,588.8 | 94.506 | 901.70 |

As shown in Table 1, the position of a D band peak center in the Raman spectrum of the first carbonaceous anode active material exhibited a blue shift of 3.9 units per centimeter ($cm^{-1}$) with respect to the position of a D band peak center in the Raman spectrum of the second carbonaceous anode active material. Also, the position of a G band peak in the Raman spectrum of the first carbonaceous anode active material exhibited a blue shift of 2.4 $cm^{-1}$ with respect to the position of a G band peak center in the Raman spectrum of the second carbonaceous anode active material. Also, a D band peak width in the Raman spectrum of the first carbonaceous anode active material was about 58% of a D band peak width in the Raman spectrum of the second carbonaceous anode active material.

Evaluation Example 3: Interfacial Resistance Evaluation

The overall resistance of each all-solid secondary battery manufactured in Comparative Examples 1 and 2 was measured.

The impedance of each of the all-solid secondary batteries manufactured in Comparative Examples 1 and 2 was measured using an impedance analyzer (Solartron 1400A/1455A impedance analyzer) according to a 2-probe method. The frequency range was 0.1 Hertz (Hz) to 1 MHz, and the amplitude voltage was 10 millivolts (mV). The impedance measurement was carried out at 25° C. in ambient air atmosphere. Nyquist plots showing the results of the impedance measurement are shown in FIG. 10.

Figure 10:
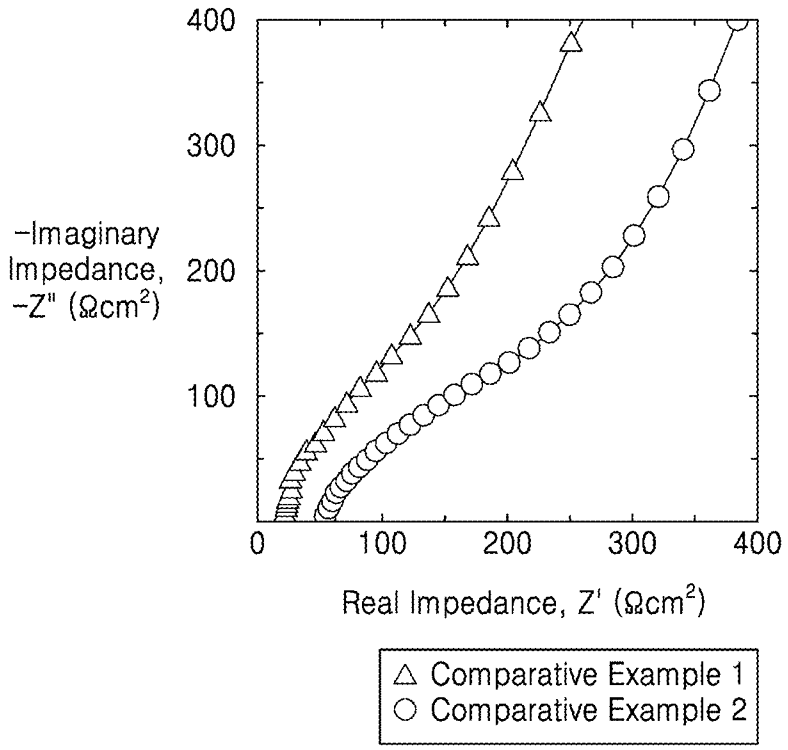
FIG. 10 is a graph of impedance −Z" (ohm square centimeter, $\Omega \cdot cm^2$) versus impedance Z' ($\Omega \cdot cm^2$) and shows a Nyquist plot showing impedance measurement results of all-solid secondary batteries manufactured in Comparative Examples 1 and 2.

As a result of fitting the Nyquist plot of FIG. 10 to an equivalent circuit, the all-solid secondary battery of Comparative Example 1 had an interfacial resistance of about 100 $\Omega cm^2$, and the all solid secondary battery of Comparative Example 2 had an interfacial resistance of about 350 $\Omega cm^2$.

Also, as shown in FIG. 10, the all-solid secondary battery of Comparative Example 1 had a reduced ohmic resistance, as compared with that of the all-solid secondary battery of Comparative Example 2.

Accordingly, it was confirmed that a total resistance of the interfacial resistance and the ohmic resistance of the all-solid secondary battery of Comparative Example 1 were reduced, as compared with that of the all-solid secondary battery of Comparative Example 2.

Without being limited by theory, it is understood that the reduction in the total resistance of the all-solid secondary battery of Comparative Example 1 is attributed to sintering of the precursor layer along with the solid electrolyte layer during the thermal treatment of the precursor layer, and the formation of covalent bonds between the solid electrolyte layer and the first anode active material layer to thereby increase the active interfacial area, leading to an increased diffusion rate of lithium ions.

Evaluation Example 4: Charge-Discharge Test

The charge and discharge characteristics of the all-solid secondary batteries manufactured in Examples 1 to 4 and Comparative Examples 1 and 2 were evaluated according to a charge-discharge test as follows. The charge-discharge test of the all-solid secondary batteries was carried out in a 60° C. thermostat.

In the $1^{st}$ cycle, charging was carried out with a constant current of 0.6 $mA/cm^2$ until a battery voltage of 4.2 V was reached, and subsequently, discharging was carried out with a constant current of 0.6 $mA/cm^2$ until a battery voltage of 2.8 V was reached.

In the $2^{nd}$ to $13^{th}$ cycles, charging was carried out with a constant current of 1.5 $mA/cm^2$ until a battery voltage of 4.2 V was reached, and subsequently, discharging was carried out with a constant current of 1.5 $mA/cm^2$ until a battery voltage of 2.8 V was reached.

In the $14^{th}$ to $18^{th}$ cycles, charging was carried out with a constant current of 2.0 $mA/cm^2$ until a battery voltage of 4.2 V was reached, and subsequently, discharging was carried out with a constant current of 2.0 $mA/cm^2$ until a battery voltage of 2.8 V was reached.

In the $19^{th}$ to $23^{rd}$ cycles, charging was carried out with a constant current of 3.0 $mA/cm^2$ until a battery voltage of 4.2V was reached, and subsequently, discharging was carried out with a constant current of 3.0 $mA/cm^2$ until a battery voltage of 2.8V was reached.

In the $24^{th}$ to $26^{th}$ cycles, charging was carried out with a constant current of 4.0 $mA/cm^2$ until a battery voltage of 4.2 V was reached, and subsequently, discharging was carried out with a constant current of 4.0 $mA/cm^2$ until a battery voltage of 2.8 V was reached.

In the $27^{th}$ to $40^{th}$ cycles, charging was carried out with a constant current of 6.0 $mA/cm^2$ until a battery voltage of 4.2 V was reached, and subsequently, discharging was carried out with a constant current of 6.0 $mA/cm^2$ until a battery voltage of 2.8 V was reached.

Some of the charge-discharge test results are shown in FIGS. 11A, 11B, 11C, and 11D.

Figure 11A:
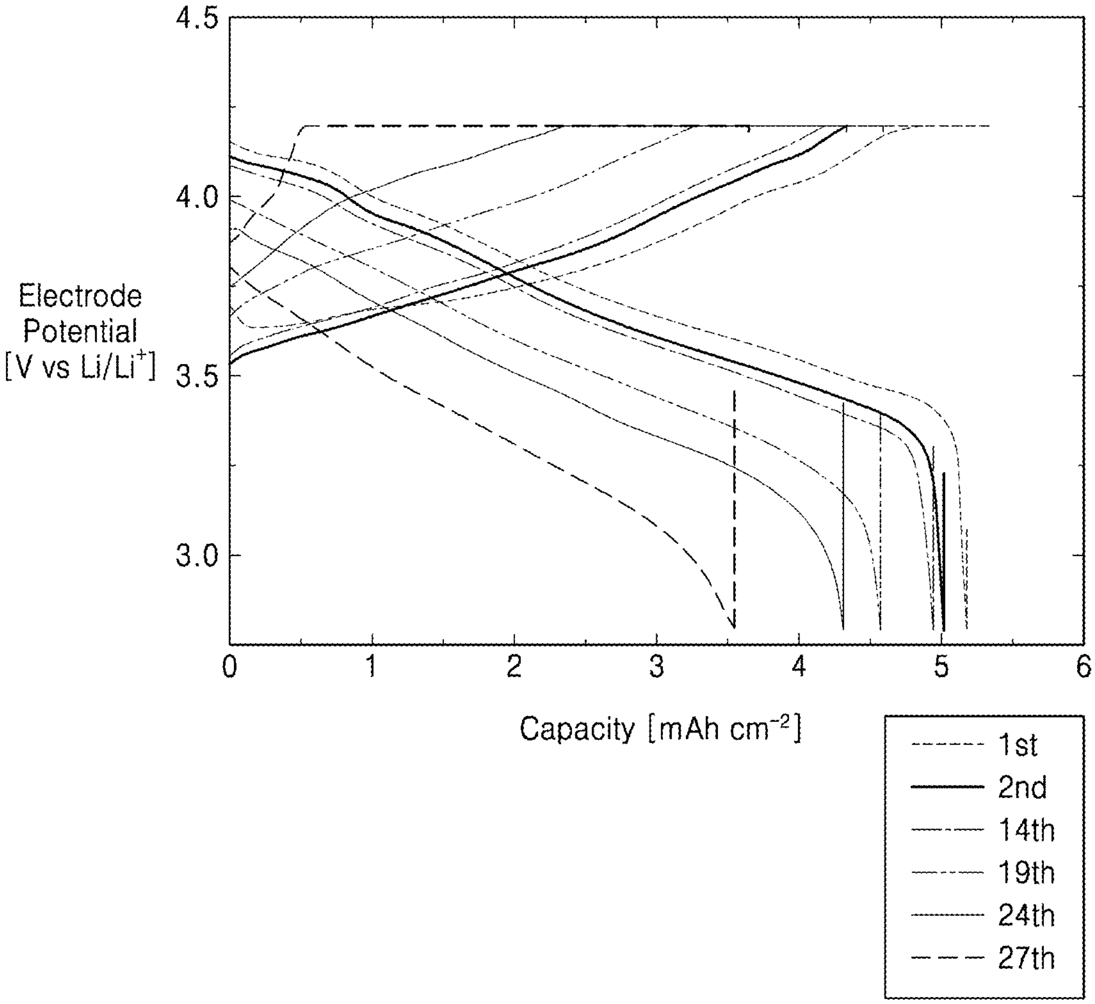
FIG. 11A is a graph of electrode potential (volts versus lithium, V vs $Li/Li^+$) versus capacity (milliampere hours per square centimeter, $mAh/cm^2$) and shows a charge-discharge profile of an all-solid secondary battery manufactured in Example 1.

As shown in FIG. 11A, since the all-solid secondary battery of Example 1 simultaneously includes the first anode active material layer sintered with the solid electrolyte layer, and the second anode active material layer disposed on the first anode active material layer, the all-solid secondary battery of Example 1 could perform up to 40 cycles of charging and discharging and exhibited stable charge and discharge performance even at a high current density of 6.0 $mA/cm^2$. Although not shown in the graph, the all-solid secondary battery of Example 1 exhibited a high charge and discharge efficiency of 98.5% or higher even at the $40^{th}$ cycle. The charge and discharge efficiency at the $40^{th}$ cycle is a percentage of the discharge capacity at the $40^{th}$ cycle with respect to the charge capacity at the $40^{th}$ cycle. Accordingly, it was confirmed that the all-solid secondary battery of Example 1 maintained a stable interface during a charge and discharge process and induced uniform deposition of lithium.

Figure 11B:
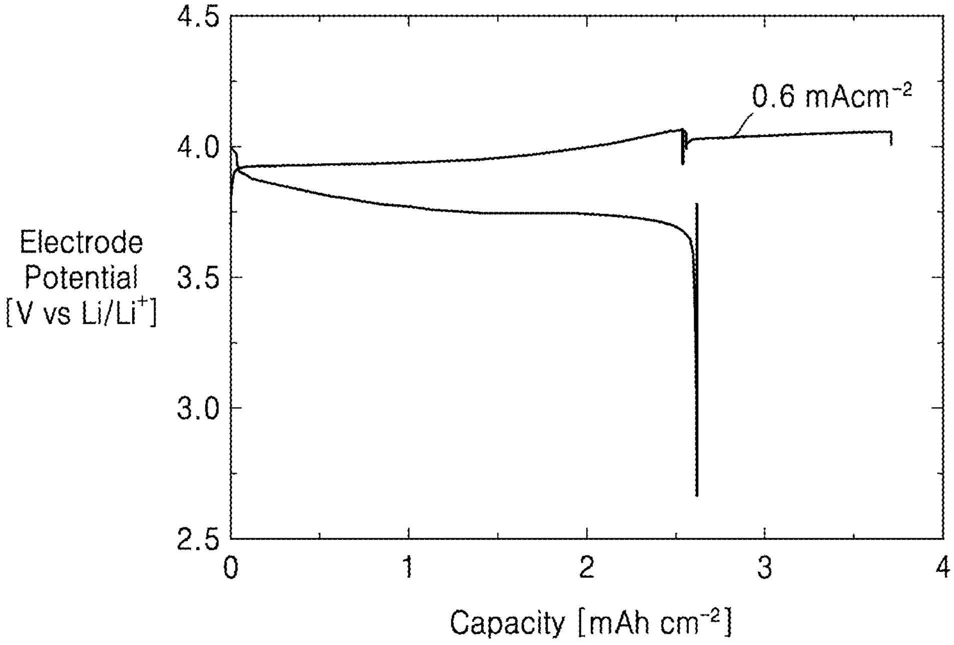
FIG. 11B is a graph of electrode potential (V vs $Li/Li^+$) versus capacity ($mAh/cm^2$) and shows a charge-discharge profile of an all-solid secondary battery manufactured in Comparative Example 1.

As shown in FIG. 11B, in the all-solid secondary battery of Comparative Example 1 including the first anode active material layer alone, a short-circuit occurred during charging at the $1^{st}$ cycle.

Figure 11C:
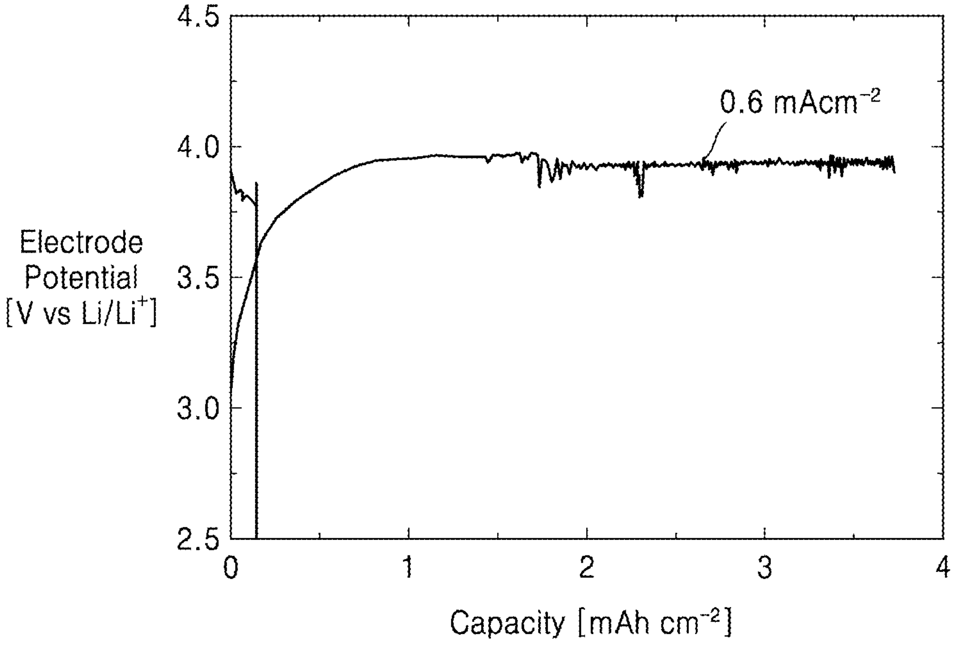
FIG. 11C is a graph of electrode potential (V vs $Li/Li^+$) versus capacity ($mAh/cm^2$) and shows a charge-discharge profile of an all-solid secondary battery manufactured in Comparative Example 2.

As shown in FIG. 11C, in the all-solid secondary battery of Comparative Example 2 including the second anode active material layer alone, a short-circuit occurred during charging at the $1^{st}$ cycle.

Although not shown, in the all-solid secondary battery of Comparative Example 3, in which a multilayer structure is formed and the first anode active material layer were not thermally treated, a short-circuit occurred during charging and discharging.

Although not shown, the all-solid secondary batteries of Examples 2, 3, 5, and 6 also exhibited stable charge and discharge characteristics.

Figure 11D:
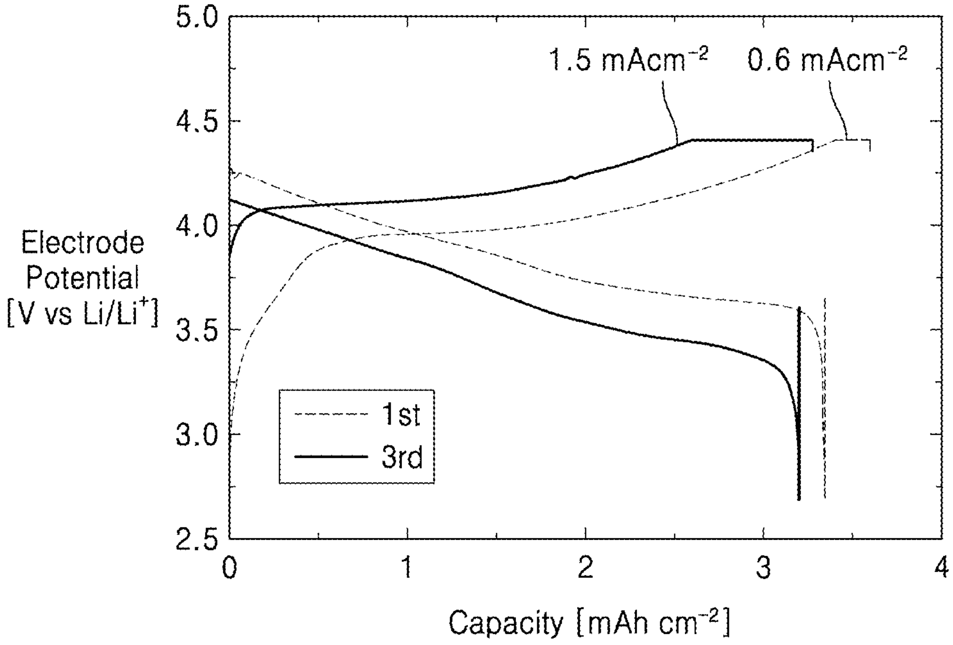
FIG. 11D is a graph of electrode potential (V vs $Li/Li^+$) versus capacity ($mAh/cm^2$) and shows a charge-discharge profile of an all-solid secondary battery manufactured in Example 4.

As shown in FIG. 11D, the all-solid secondary battery of Example 4 exhibited stable charge and discharge performance.

As described above, the all-solid secondary battery according to any of the above-described aspects may be applied to various portable devices or vehicles.

According to an aspect, the all-solid secondary battery may prevent a short-circuit and have excellent cycle characteristics.

It should be understood that aspects described herein should be considered in a descriptive sense only and not for purposes of limitation. Descriptions of features or aspects within each aspect should be considered as available for other similar features or aspects in other aspects. While one or more aspects have been described with reference to the figures, it will be understood by those of ordinary skill in the art that various changes in form and details may be made therein without departing from the spirit and scope as defined by the following claims.

What is claimed is:

1. An all-solid secondary battery comprising:

a cathode layer comprising a cathode active material layer;

an anode layer; and a solid electrolyte layer comprising a solid electrolyte, wherein the solid electrolyte layer is disposed between the cathode layer and the anode layer, wherein the anode layer comprises an anode current collector, a first anode active material layer in contact with the solid electrolyte layer, and a second anode active material layer disposed between the anode current collector and the first anode active material layer, wherein the first anode active material layer comprises a first carbonaceous anode active material comprising amorphous carbon, and the second anode active material layer comprises a second carbonaceous anode active material, and a first intensity ratio of an intensity of a D band peak to an intensity of a G band peak in a Raman spectrum of the first carbonaceous anode active material is less than a second intensity ratio of an intensity of a D band peak to an intensity of a G band peak in a Raman spectrum of the second carbonaceous anode active material.

2. The all-solid secondary battery of claim 1, wherein the first intensity ratio is about 0.1 to about 0.95, and the second intensity ratio is about 1.0 to about 10.

3. The all-solid secondary battery of claim 1, wherein a position of a D band peak center in the Raman spectrum of the first carbonaceous anode active material exhibits a blue shift of about 2 $cm^{-1}$ to about 4 $cm^{-1}$ with respect to a position of a D band peak center in the Raman spectrum of the second carbonaceous anode active material, wherein a position of a G band peak center in the Raman spectrum of the first carbonaceous anode active material exhibits a blue shift of about 1 $cm^{-1}$ to about 3 $cm^{-1}$ with respect to a position of a G band peak center in the Raman spectrum of the second carbonaceous anode active material, and wherein a full width at half maximum of the D band peak of the first carbonaceous anode active material is about 50% to about 80% less than a full width at half maximum of the D band peak of the second carbonaceous anode active material.

4. The all-solid secondary battery of claim 1, wherein at least one of the first carbonaceous anode active material or the second carbonaceous anode active material is in a form of particles, and wherein the particles have an average particle diameter of about 10 nm to about 4 micrometers or less.

5. The all-solid secondary battery of claim 1, wherein the second carbonaceous anode active material comprises amorphous carbon.

6. The all-solid secondary battery of claim 1, wherein at least one of the first anode active material layer or the second anode active material layer consists of the first carbonaceous anode active material or the second carbonaceous anode active material, respectively.

7. The all-solid secondary battery of claim 1, wherein at least one of the first anode active material layer or the second anode active material layer further comprises a metal or metalloid anode active material comprising a metal, a metalloid, or a combination thereof.

8. The all-solid secondary battery of claim 7, wherein the metal or metalloid anode active material comprises at least one of indium, silicon, gallium, tin, aluminum, titanium, zirconium, niobium, germanium, antimony, bismuth, gold, platinum, palladium, magnesium, silver, or zinc.

9. The all-solid secondary battery of claim 7, wherein each of the first anode active material layer and the second anode active material layer further comprises the metal or metalloid anode active material, and wherein an amount of the metal or metalloid anode active material in the second anode active material layer is greater than an amount of the metal or metalloid anode active material in the first anode active material layer.

10. The all-solid secondary battery of claim 7, wherein the first anode active material layer comprises a composite of first particles and second particles, wherein the first particles consist of the first carbonaceous anode active material comprising amorphous carbon and the second particles consist of the metal or metalloid anode active material, wherein an amount of the second particles is about 1 weight percent to about 60 weight percent, based on a total weight of the composite, and optionally wherein the second anode active material layer comprises a mixture of third particles and fourth particles, wherein the third particles consist of the second carbonaceous material and the fourth particles consist of the metal or metalloid anode active material, wherein the second carbonaceous material is amorphous carbon, and wherein an amount of the fourth particles is about 1 weight percent to about 60 weight percent based on a total weight of the mixture.

11. The all-solid secondary battery of claim 10, wherein an average particle diameter of the third particles in the second anode active material layer is about 50% or less of an average particle diameter of the first particles in the first anode active material layer, and wherein an average particle diameter of the fourth particles included in the second anode active material layer is about 50% or less of an average particle diameter of the second particles included in the first anode active material layer.

12. The all-solid secondary battery of claim 1, wherein the first carbonaceous anode active material is bound to the solid electrolyte layer by at least one of a covalent bond or an ionic bond, and is a sintered product of a carbonaceous precursor, wherein the carbonaceous precursor is the second carbonaceous anode active material.

13. The all-solid secondary battery of claim 1, wherein the first anode active material layer does not comprise an organic material.

14. The all-solid secondary battery of claim 1, wherein a thickness of the first anode active material layer is about 5% to about 50% of a total thickness of the cathode active material layer, and the first anode active material layer has a thickness of about 10 nanometers to about 10 micrometers, wherein a thickness of the second anode active material layer is about 5% to about 50% of a total thickness of the cathode active material layer, and the second anode active material layer has a thickness of about 1 micrometer to about 50 micrometers, or both.

15. The all-solid secondary battery of claim 1, wherein a thickness of the first anode active material layer is less than a thickness of the second anode active material layer.

16. The all-solid secondary battery of claim 1, wherein at least one of the first anode active material layer or the second anode active material layer further comprises a binder.

17. The all-solid secondary battery of claim 1, further comprising a third anode active material layer disposed between the anode current collector and the second anode active material layer or between the first anode active material layer and the second anode active material layer, wherein the third anode active material layer is a metal layer comprising lithium or a lithium alloy.

18. The all-solid secondary battery of claim 17, wherein the anode current collector, the first anode active material layer, the second anode active material layer, and regions therebetween are Li-free regions which do not comprise lithium in an initial state or a post-discharge state of the all-solid secondary battery.

19. The all-solid secondary battery of claim 1, wherein the solid electrolyte is an oxide-containing solid electrolyte or a sulfide-containing solid electrolyte, wherein the oxide-containing solid electrolyte comprises at least one of $Li_{1+x+y}Al_xTi_{2-x}Si_yP_{3-y}O_{12}$ wherein 0<x<2 and 0≤y<3, $BaTiO_3$, $Pb(Zr_aTi_{1-a})O_3$ wherein 0≤a≤1, $Pb_{1-x}La_xZr_{1-y}Ti_yO_3$ wherein 0≤x<1 and 0≤y<1, $Pb(Mg_{1/3}Nb_{2/3})O_3$—$PbTiO_3$, $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$ wherein 0<x<2 and 0<y<3, $Li_xAl_yTi_z(PO_4)_3$ wherein 0<x<2, 0<y<1, and 0<z<3, $Li_{1+x+y}(Al_aGa_{1-a})_x(Ti_bGe_{1-b})_{2-x}Si_yP_{3-y}O_{12}$ wherein 0≤x≤1, 0≤y≤1, 0≤a≤1, and 0≤b≤1, $Li_xLa_yTiO_3$ wherein 0<x<2 and 0<y<3, $Li_2O$, LiOH, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$, wherein M is Te, Nb, or Zr, and 0≤x≤10, a garnet solid electrolyte comprising at least one of $Li_7La_3Zr_2O_{12}$ or $Li_{3+x}La_3Zr_{2-a}M_aO_{12}$ wherein M is at least one of Ga, W, Nb, Ta, or Al, 1≤x≤10, and 0≤a<2, or a combination thereof, or the sulfide-containing solid electrolyte comprises at least one of $Li_2S$—$P_2S_5$, $Li_2S$—$P_2S_5$—LiX wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ wherein m and n are each independently a positive number, and Z is Ge, Zn, or Ga, $Li_2S$—$GeS_2$, $Li_2S$—$SiS_2$—$Li_3PO_4$, $Li_2S$—$SiS_2$—$Li_pMO_q$ wherein p and q are each independently a positive number, and M is P, Si, Ge, B, Al, Ga, or In, $Li_{7-x}PS_{6-x}Cl_x$ wherein 0≤x≤2, $Li_{7-x}PS_{6-x}Br_x$ wherein 0≤x≤2, or $Li_{7-x}PS_{6-x}I_x$ wherein 0≤x≤2, an argyrodite solid electrolyte comprising at least one of $Li_{7-x}PS_{6-x}Cl_x$ wherein 0≤x≤2, $Li_{7-x}PS_{6-x}Br_x$ wherein 0≤x≤2, or $Li_{7-x}PS_{6-x}I_x$ wherein 0≤x≤2, or a combination thereof.

20. A method of manufacturing the all-solid secondary battery of claim 1, the method comprising:

providing the solid electrolyte layer;

disposing a first anode active material composition comprising the first carbonaceous anode active material on a first surface of the solid electrolyte layer;

thermally treating the first anode active material composition to form the first anode active material layer comprising the first carbonaceous anode active material comprising amorphous carbon;

disposing the second anode active material layer comprising the second carbonaceous anode active material on a surface of the first anode active material layer; and disposing the cathode active material layer on a second surface of the solid electrolyte layer to manufacture the all-solid secondary battery, wherein the thermal treatment is optionally performed at a temperature of about 300° C. to about 900° C. for about 0.1 hour to about 20 hours, and wherein optionally washing the surface of the first anode active material layer with an acidic solution before disposing the second anode active material.

* * * * *